US012712307B2

United States Patent

(12) United States Patent
Leung

(10) Patent No.: US 12,712,307 B2
(45) Date of Patent: Aug. 18, 2026

(54) ELECTRICAL AND MECHANICAL COUPLING SYSTEMS FOR ARTIFICIAL POWERED TREES AND ASSOCIATED METHODS

(71) Applicant: BELGRAVIA WOOD LIMITED, Road Town (VG)

(72) Inventor: Chi Yin Alan Leung, Apleichau (HK)

(73) Assignee: BELGRAVIA WOOD LIMITED

( * ) Notice: Subject to any disclaimer, the term of this patent is extended or adjusted under 35 U.S.C. 154(b) by 316 days.

(21) Appl. No.: 18/559,617

(22) PCT Filed: May 12, 2022

(86) PCT No.: PCT/US2022/028918

§ 371 (c)(1),
(2) Date: Nov. 8, 2023

(87) PCT Pub. No.: WO2022/241080

PCT Pub. Date: Nov. 17, 2022

(65) Prior Publication Data

US 2024/0235089 A1 Jul. 11, 2024

(30) Foreign Application Priority Data

May 12, 2021 (CN) ........................ 202121011183.9

(51) Int. Cl.

*H01R 13/405* (2006.01)
*A47G 33/06* (2006.01)
*H01R 13/05* (2006.01)
*H01R 13/11* (2006.01)
*H01R 13/502* (2006.01)

(52) U.S. Cl.

CPC ........... *H01R 13/405* (2013.01); *A47G 33/06* (2013.01); *H01R 13/502* (2013.01); *H01R 13/05* (2013.01); *H01R 13/11* (2013.01); *H01R 2201/00* (2013.01)

(58) Field of Classification Search

CPC ...... H01R 13/405; H01R 43/26; H01R 13/05; H01R 13/11; H01R 2201/00; A47G 33/06; Y10T 29/49117

USPC .......................................................... 439/660

See application file for complete search history.

(56) References Cited

U.S. PATENT DOCUMENTS

| | | | | |
|---|---|---|---|---|
| 3,985,924 | A | 10/1976 | Pritza | |
| 9,648,919 | B2 * | 5/2017 | Chen | H01R 43/26 |
| 10,085,504 | B2 * | 10/2018 | Chen | H01R 13/502 |
| 10,098,491 | B2 * | 10/2018 | Chen | A47G 33/06 |
| 10,433,604 | B2 * | 10/2019 | Chen | H01R 31/00 |
| 10,721,981 | B2 * | 7/2020 | Chen | F21V 23/001 |

(Continued)

OTHER PUBLICATIONS

Supplementary European Search Report dated Feb. 19, 2025 issued in European Application No. 22808321.8.

*Primary Examiner* — Gary F Paumen

(74) *Attorney, Agent, or Firm* — TROUTMAN PEPPER LOCKE LLP; Christopher C. Close, Jr.; Nicholas H. Doss

(57) ABSTRACT

A connection system to facilitate the mechanical coupling, and the transfer of electrical power between, trunk sections of an artificial tree is disclosed. The connection system can include a mechanical coupling system having a male connector configured to mate with a female connector. At least one of the male and female connectors including an anti-twist component configured to mate with a receiving cavity of a trunk collar such that the trunks are prevent from rotating once assembled.

18 Claims, 29 Drawing Sheets

(56) References Cited

U.S. PATENT DOCUMENTS

| | | | | |
|---|---|---|---|---|
| 10,881,158 | B1 * | 1/2021 | Chen | A41G 1/005 |
| 2012/0295041 | A1 | 11/2012 | Chen | |
| 2013/0301247 | A1 | 11/2013 | Chen | |
| 2019/0000169 | A1 * | 1/2019 | Chen | A47G 33/06 |
| 2019/0104877 | A1 * | 4/2019 | Chen | F21V 23/06 |
| 2021/0007429 | A1 * | 1/2021 | Chen | F21S 4/10 |

* cited by examiner

ELECTRICAL AND MECHANICAL COUPLING SYSTEMS FOR ARTIFICIAL POWERED TREES AND ASSOCIATED METHODS

CROSS-REFERENCE TO RELATED APPLICATIONS

This application is a national stage application, filed under 35 U.S.C. § 371, of International Patent Application No. PCT/US22/28918, filed on 12 May 2022, which claims benefit of Chinese Utility Model No. 202121011183.9, filed 12 May 2021, the entire contents of which is fully incorporated herein by reference.

FIELD OF THE INVENTION

Embodiments of the present disclosure relate generally to power transfer systems, and, more particularly, to power transfer systems for use with artificial trees, such as artificial Christmas trees.

BACKGROUND

As part of the celebration of the Christmas season, many people traditionally bring a pine or evergreen tree into their home and decorate it with ornaments, lights, garland, tinsel, and the like. Natural trees, however, can be quite expensive and are recognized by some as a waste of environmental resources. In addition, natural trees can be messy, leaving both sap and needles behind after removal, and requiring water to prevent drying out and becoming a fire hazard. Natural trees must be decorated, and at the end of the Christmas season the decorations must be removed. Because the needles have likely dried and may be quite sharp by this time, removal of the decorations can be a painful process. In addition, natural trees often are disposed in landfills, further polluting these overflowing environments.

To overcome the disadvantages of a natural Christmas tree, yet still incorporate a tree into the holiday celebration, a great variety of artificial Christmas trees are available. For the most part, these artificial trees must be assembled for use and disassembled after use. Artificial trees have the advantage of being usable over a period of years and thereby eliminate the annual expense of purchasing live trees for the short holiday season. Further, they help reduce the chopping down of trees for a temporary decoration and the subsequent disposal, typically in a landfill, of those trees.

Generally, artificial Christmas trees comprise a multiplicity of branches each formed of a plurality of plastic needles held together by twisting a pair of wires about them. In other instances, the branches are formed by twisting a pair of wires about an elongated sheet of plastic material having a large multiplicity of transverse slits. In still other artificial Christmas trees, the branches are formed by injection molding of plastic.

Irrespective of the form of the branch, many existing designs of artificial Christmas trees each comprise a plurality of trunk sections connectable to one another. For example, in many designs, a first and second trunk section each comprise an elongate body. A first end of the body includes an extending portion (e.g., a male end) and a second end of the body includes a receiving portion (e.g., a female end). Typically, the body is a cylinder. Near the first end the body tapers slightly to reduce the diameter of the body. In other words, the diameter of the second end (i.e., the receiving portion), is larger than the diameter of the first end (i.e., the extending portion). To mechanically connect the trunk sections, the second end of a second trunk section receives the first end of a first trunk section. For example, the tapered end of the first trunk section is inserted into the non-tapered end of the second trunk section. Some existing designs include electrical connectors that each have electrical contacts. For example, referring to the previous example, some designs include an electrical connector having electrical prongs positioned on or in the extending portion of the first end and an electrical connector having electrical contacts positioned in the receiving portion of the second end, such that the two electrical connectors mate to form an electrical connection between the first and second trunk sections. In this manner, a plurality of trunk sections can be connected to assemble a tree.

It may be difficult to manufacture trunk sections having tolerances that permit easy assembly and disassembly without also permitting a trunk section to wobble with respect to an adjacent tree section. That is, if an extending portion of a first trunk section has an outer diameter that is too similar to an inner diameter of a receiving portion of a second trunk section, it may be difficult for an assembler to assemble and/or disassemble the tree. Alternately, if the extending portion of the first trunk section has an outer diameter that is too small with respect to the inner diameter of the receiving portion of the second trunk section, the first trunk section may be permitted to wobble or shift with respect to the second trunk section. Thus, any jostling of the tree may cause one or more portions of the tree to shift, which may result in tree ornaments or other decorations being knocked from the tree. This may result in damaged tree ornaments or other decorations, damage to the tree itself, or injury to assemblers and/or decorators.

What is needed, therefore, is an artificial tree that allows a user to connect neighboring trunk sections with a secure mechanical coupling of the neighboring trunk sections such that the neighboring trunk sections cannot rotate once assembled. Embodiments of the present disclosure address these and other needs, as will become apparent upon reading the description below in conjunction with the drawings.

BRIEF SUMMARY

Briefly described, embodiments of the present disclosure comprise a trunk connection system power to facilitate secure mechanical coupling of adjacent trunk sections of an artificial tree and the transfer of electrical power between the adjacent trunk sections. The trunk connection system can advantageously enable neighboring trunk sections to be electrically connected and mechanically coupled without the need to rotationally align the trunk sections during assembly and can also provide a secure connection between the neighboring trunk sections in a single rotational alignment. Embodiments of the present disclosure can therefore facilitate assembly of an artificial tree, reducing user frustration during the assembly process.

The disclosed power transfer systems can comprise a first power distribution subsystem disposed within or attached along a first trunk section of an artificial tree. The power transfer system can further comprise a second power distribution subsystem disposed within or attached along a second trunk section of an artificial tree. The first power distribution subsystem can comprise a male end with first electrical contacts and the second power distribution subsystem can comprise a female end with second electrical contacts. The first electrical contacts can be brought into contact with the second electrical contacts to conduct electricity between the power distribution subsystems, and, therefore, between the trunk sections of the tree.

To enable neighboring trunk sections to be mechanically coupled the male end can comprise an extending portion and a male mechanical coupler that can include one or more angled guiding surfaces. When the male mechanical coupler and the extending portion of the male end are inserted into the receiving portion of the female end, one of the guiding surfaces of the male mechanical coupler can contact the guiding protrusion of the female mechanical coupler. The angled disposition of the guiding surface can direct the guiding protrusion toward the guiding channel of the male mechanical coupler, causing the male end to rotate with respect to the female end. Upon alignment of the guiding protrusion and the guiding channel, gravity or another force can cause the guiding protrusion to traverse the guiding channel, such that the male end and female end become mechanically coupled.

The male end can comprise a male end electrical connector, and the female end can comprise a female end electrical connector. When the guiding protrusion and guiding channel become aligned, electrical contacts of the male end electrical connector can become aligned with electrical contacts of the female end electrical connector, and when the male end and female end become mechanically coupled, the male end electrical connector can establish electrical communication with the female end electrical connector such that electricity can be transferred between the male end and the female end.

The foregoing summarizes only a few aspects of the present disclosure and is not intended to be reflective of the full scope of the present disclosure. Additional features and advantages of the present disclosure are set forth in the following detailed description and drawings, may be apparent from the detailed description and drawings, or may be learned by practicing the present disclosure. Moreover, both the foregoing summary and following detailed description are exemplary and explanatory and are intended to provide further explanation of the presently disclosed technology as claimed.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner.

DETAILED DESCRIPTION

Figure 1:
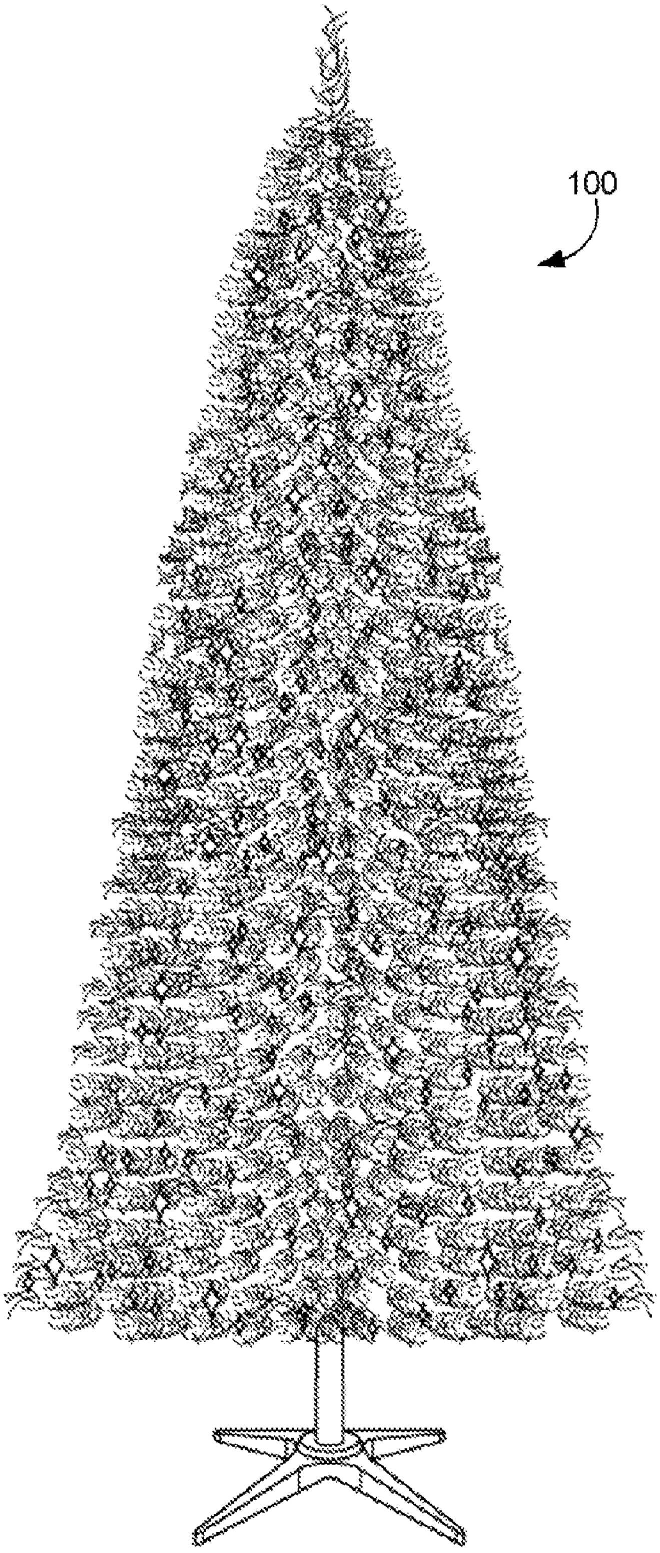
FIG. 1 depicts an assembled artificial Christmas tree, in accordance with some examples of the present disclosure.

Examples of the present disclosure relate to artificial trees, such as artificial Christmas trees. Although preferred examples of the disclosed technology are explained in detail, it is to be understood that other examples are contemplated. Accordingly, it is not intended that the disclosed technology is limited in its scope to the details of construction and arrangement of components set forth in the following description or illustrated in the drawings. The disclosed technology is capable of other examples and of being practiced or carried out in various ways. Also, in describing the preferred examples, specific terminology will be resorted to for the sake of clarity.

It should also be noted that, as used in the specification and the appended claims, the singular forms "a," "an" and "the" include plural references unless the context clearly dictates otherwise. References to a composition containing "a" constituent is intended to include other constituents in addition to the one named.

Also, in describing the preferred examples, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary examples include from the one particular value and/or to the other particular value.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

To facilitate an understanding of the principles and features of the disclosed technology, various illustrative examples are explained below. In particular, the presently disclosed technology is described in the context of being an artificial tree power system. Some examples of the disclosed technology are disclosed in the context of being mechanical connectors and/or electrical connectors for use in an artificial tree power system. The present disclosure, however, is not so limited, and can be applicable in other contexts. For example, and not limitation, the present disclosure may improve other power systems, such as light poles, lamps, extension cord systems, power cord connection systems, patio umbrellas, and the like. These examples are contemplated within the scope of the present disclosure. Accordingly, when the present disclosure is described in the context of a power transfer system for an artificial Christmas tree, it will be understood that other examples can take the place of those referred to.

The present disclosure comprises an artificial trunk comprising trunk sections that are engaged with one another to form the trunk of an artificial tree. At least some of the trunk sections may be hollow, and power distribution subsystems may be partially disposed within one or more trunk sections. Power distribution subsystems can comprise a female end or a male end located proximate either end of the trunk sections. One or more trunks sections can comprise both a female end and a male end. When one trunk section is engaged with another trunk section, the male end of one power distribution subsystem engages with and is electrically and mechanically connected to the female end of a neighboring power distribution subsystem. The engaged male and female ends may be joined via a coupling, and the coupling may house at least a portion of the power distribution subsystems externally to the trunk sections, which may provide easier access to or make it easier to replace wiring and other components of the power distribution subsystems without distracting from the aesthetics of the artificial tree. One or more of the power subsystems may be in electrical communication with an external power source (e.g., a wall outlet) and configured to provide electricity to joined power distribution subsystems. Thus, by electrically connecting a power distribution subsystem of a trunk section to an external power source, electrical power flows from the source to that trunk section, and from that trunk section through the coupling and on to other trunk sections.

A variety of systems exist to facilitate joining the male and female ends of power distribution subsystems. Although conventional plug and outlet systems can be used, such as those manufactured in accordance with NEMA standards, in some cases, it can be difficult in conventional designs to align the male prongs of one trunk section with the female holes of another trunk section. In order to engage the male end with the female end, the assembler of the tree is generally required to vertically align the trunk sections while additionally rotationally aligning the two trunk sections to allow the male prongs to line up with the female holes. Even if the trunk sections are perfectly vertical, in conventional systems, the male prongs can only engage the female holes if the male prongs are rotationally aligned with the female holes. If the male prongs are not rotationally aligned with the female holes, the male prongs may abut the area around the female holes rather than being inserted into the female holes, and an electrical connection will not be made. Attempting to align the male prongs and the female holes can therefore take significant time and can be a frustrating experience for a user. Further difficulty and frustration can be caused if the male prongs become bent such that one or more of the male prongs do not properly align with the corresponding female hole.

Some existing systems can include male and female connectors configured to connect at a plurality of rotational alignments. For example, some existing systems can include male and female coaxial electrical connectors. As explained above, however, such designs can permit a first trunk section to freely rotate in relation to an adjacent second trunk section while the first and section trunk sections are electrically connected. In some such designs the first trunk section can freely rotate in a full rotation with respect to the second trunk section, and in some designs, the first trunk section can freely rotate in a partial rotation (i.e., less than 360°) with respect to the second trunk section. Regardless, any free rotation of the first trunk section with respect to the first trunk section can permit the first trunk section to become misaligned with the second trunk section such that ornaments or other decorations positioned on the first and second trunk sections can become located in an undesirable position or arrangement. This may undesirably alter a decorative presentation that had been arranged by a tree assembler and/or decorator.

Further, existing systems including male and female connectors configured to freely rotate while connected generally require the extending portion of the first trunk section to have an outer diameter that is smaller than the inner diameter of the receiving portion of the second trunk section, but not so small that the first tree section can wobble or shift with respect to the second trunk section. This may require a high degree of precision to consistently manufacture trunk sections having protruding portions and receiving portions that maintain an appropriate difference in diameter to simultaneously permit easy assembly and prevent wobbling or shifting of the trunk sections when assembled.

To alleviate these and other problems, the certain examples of the disclosed technology comprises a male end of a first trunk section having a first electrical connector positioned external to the first trunk section and a first mechanical coupler including an extending portion, angled guiding surfaces, and a substantially vertical (i.e., axially extending) guiding slot. The disclosed technology also comprises a female end of a second trunk section having a second electrical connector positioned external to the corresponding trunk section and a second mechanical coupler including a receiving portion and a guiding protrusion that is at least partially disposed within the second trunk section. As will be discussed more fully below, the receiving portion of the female end can be configured to receive the extending portion of the male end such that, if the guiding protrusion of the female end is aligned with the guiding slot of the male end as the extending portion is inserted into the receiving portion, the guiding protrusion can traverse the guiding slot until the extending portion is fully inserted into the receiving portion, mechanically coupling the first trunk section to the second trunk section, and the first and second electrical connectors are in electrical communication. If the guiding protrusion is not aligned with the guiding slot, the guiding protrusion can contact at least one guiding surface of the male end as the extending portion is inserted into the receiving portion, and as gravity or another force further directs the extending portion into the receiving portion, the angled nature of the guiding surface guides or directs the guiding protrusion to the guiding slot, causing the first trunk section to rotate relative the second trunk section and ultimately resulting the first electrical connector becoming vertically aligned with the second electrical connector. Once the guiding protrusion is aligned with the guiding slot (and the first electrical connector is aligned with the second electrical connector), the guiding protrusion can traverse the guiding slot until the extending portion is fully inserted into the receiving portion, mechanically coupling the first trunk section to the second trunk section, and the first and second electrical connectors are in electrical communication. in the first and second electrical connectors to become aligned and electrically connected as the mechanical couples detachably attach the first and second trunk sections together.

Embodiments of the present disclosure can also be used in a variety of systems. For example, the present disclosure can be used in low voltage systems (e.g., 5V systems for powering LEDs or small electronics) and/or can be used in high voltage systems (e.g., 120V or 240V systems that may originate from a wall outlet).

The present disclosure can be used with a variety of devices or systems, including a power distribution system (or subsystem) of an artificial tree. An artificial tree may include two, three, four, five, or six trunk sections (or more, depending on the desired tree height and the height of each trunk section). These trunk sections may be vertically stacked or otherwise attached on top of one another to form the trunk. A plurality of branches may be attachable to the trunk (or already attached, and foldable) to follow the appearance and structure of a natural tree. The artificial tree may be pre-lit, such that a power cord extending from the tree can be plugged into a wall outlet to power a string of lights that is pre-arranged around the branches of the artificial tree. Pre-lit artificial trees may be advantageous over other artificial trees because they expedite and simplify assembly and disassembly of the tree. The present disclosure can further expedite and simplify assembly of the pre-lit artificial tree by not requiring rotational alignment of the neighboring trunk sections upon initial attachment while guiding or directing the trunk sections into a single, predetermined alignment upon completion of mechanically coupling the neighboring trunk section.

Figure 2:
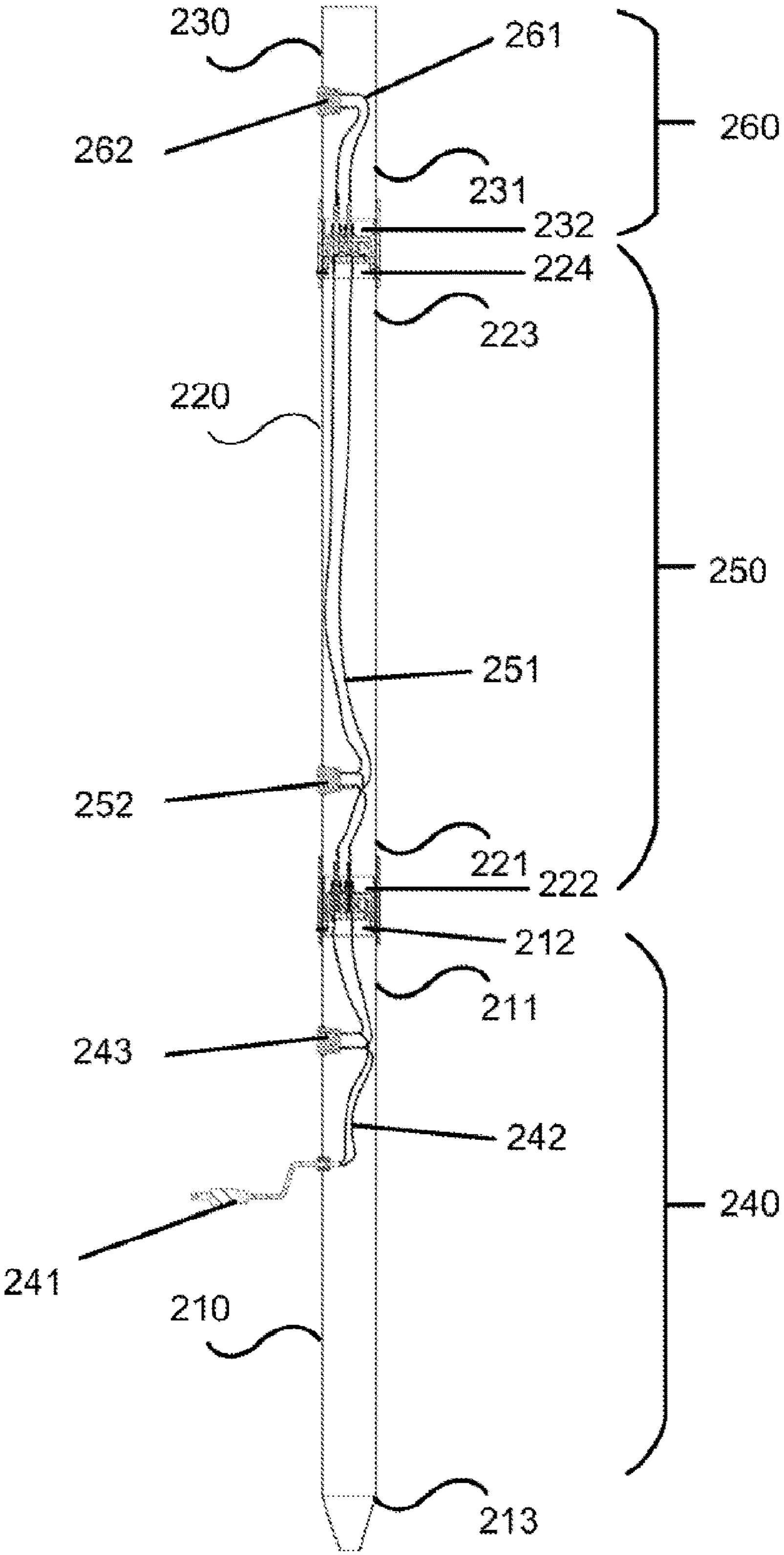
FIG. 2 depicts a cross-sectional side view of assembled trunk sections having power distribution subsystems, in accordance with some examples of the present disclosure.

Referring now to the figures, wherein like reference numerals represent like parts throughout the views, exemplary embodiments will be described in detail. FIG. 1 depicts an example portion of an assembled tree 100. FIG. 2 depicts a cross-sectional side view of assembled trunk sections 210,220,230 having power distribution subsystems 240,250,260 in accordance with some examples of the present disclosure. As depicted, the tree 100 may include a plurality of trunk sections (e.g., a first trunk section 210 and a second trunk section 220). As shown, a second end of the first trunk section 211 may be detachably attachable to a first end of the second trunk section 221. As will be described more fully, the second end 211 can include a first electrical connector 212, and the first end 221 can include a second electrical connector 222. When the first trunk section 210 and second trunk section 220 are attached, the first electrical connector 212 can be in electrical communication with the second electrical connector 222. As further depicted, a second end of the second trunk section 223 may be detachably attachable to a first end of the third trunk section 231. As will be described more fully, the second end 223 can include a third electrical connector 224, and the first end 231 can include a fourth electrical connector 232. When the second trunk section 220 and third trunk section 230 are attached, the third electrical connector 224 can be in electrical communication with the fourth electrical connector 232.

As further shown in FIG. 2, trunk sections 210,220,230 include power distribution subsystems 240,250,260. The power distribution systems 240,250,260 can comprise one or more electrical connector, one or more electrical wires, one or more light string connector, and or a power cord. For example, as depicted, power distribution system 240 comprises a power cord 241 configured to connect to a power source, such as a wall outlet, one or more wires 242 configured to carry the power throughout the trunk portion 210, a light string connector 243, and an electrical connector 212. The power cord 241 can be configured to engage a power source and distribute power to the rest of the tree. More specifically, power can flow from the wall outlet, through the power cord, through the power distribution system 240, and to accessories on the tree, such as lights or strands of lights. In some embodiments and as depicted, the power cord 241 can be located on a lower trunk section 210 of the tree for reasons of convenience and appearance (i.e., the power cord 241 is close to the wall outlets and exits the tree at a location that is not immediately visible), however it could be placed on any section.

As further depicted, power distribution system 250 comprises a first electrical connector 222, one or more electrical wires 251, a light string connector 252, and a second electrical connector 224. Power distribution system 260 comprises one or more wires 261 configured to carry the power throughout the trunk portion 230, a light string connector 262, and an electrical connector 232. As will be appreciated, the power distribution systems 240,250,260 enable electricity to flow through the trunk sections 210, 220,230. Thus, the wires, as part of the power distribution systems, enable power to flow from a power source, such as a wall outlet, through the tree and to certain accessories, such as a one more lights or strands of lights. The lights or strands of lights can therefore be illuminated when power is supplied to the tree.

Embodiments of the present disclosure can further comprise strands of lights that are unitarily integrated with the power transfer system. Thus, the lights can be connected to the wires without the need for light string connectors, although light string connectors can be optionally included. Such embodiments can be desirable for trees that come pre-strung with lights, for example.

Embodiments of the present disclosure can also comprise a bottom section 213 of one or more trunk sections 210, 220,230. The bottom section 213 can be substantially conical in shape, and can be configured to engage a stand for the tree (not shown). Accordingly, the bottom section 213 can be inserted into the stand, and the stand can support the tree, usually in a substantially vertical position.

Figure 3A:
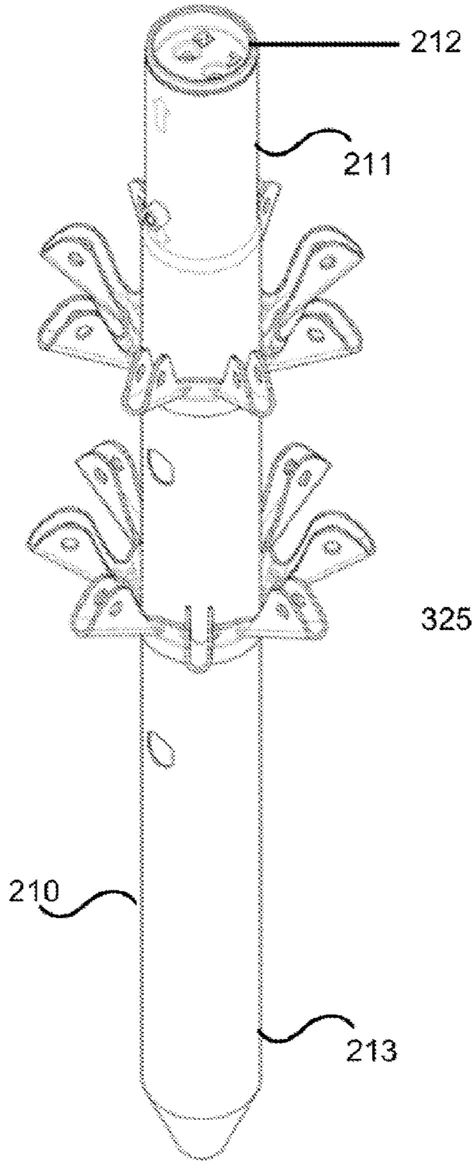
FIG. 3A depicts a perspective view of a male end of a trunk section having a female electrical connector installed therein, in accordance with some embodiments of the present disclosure.
Figure 3B:
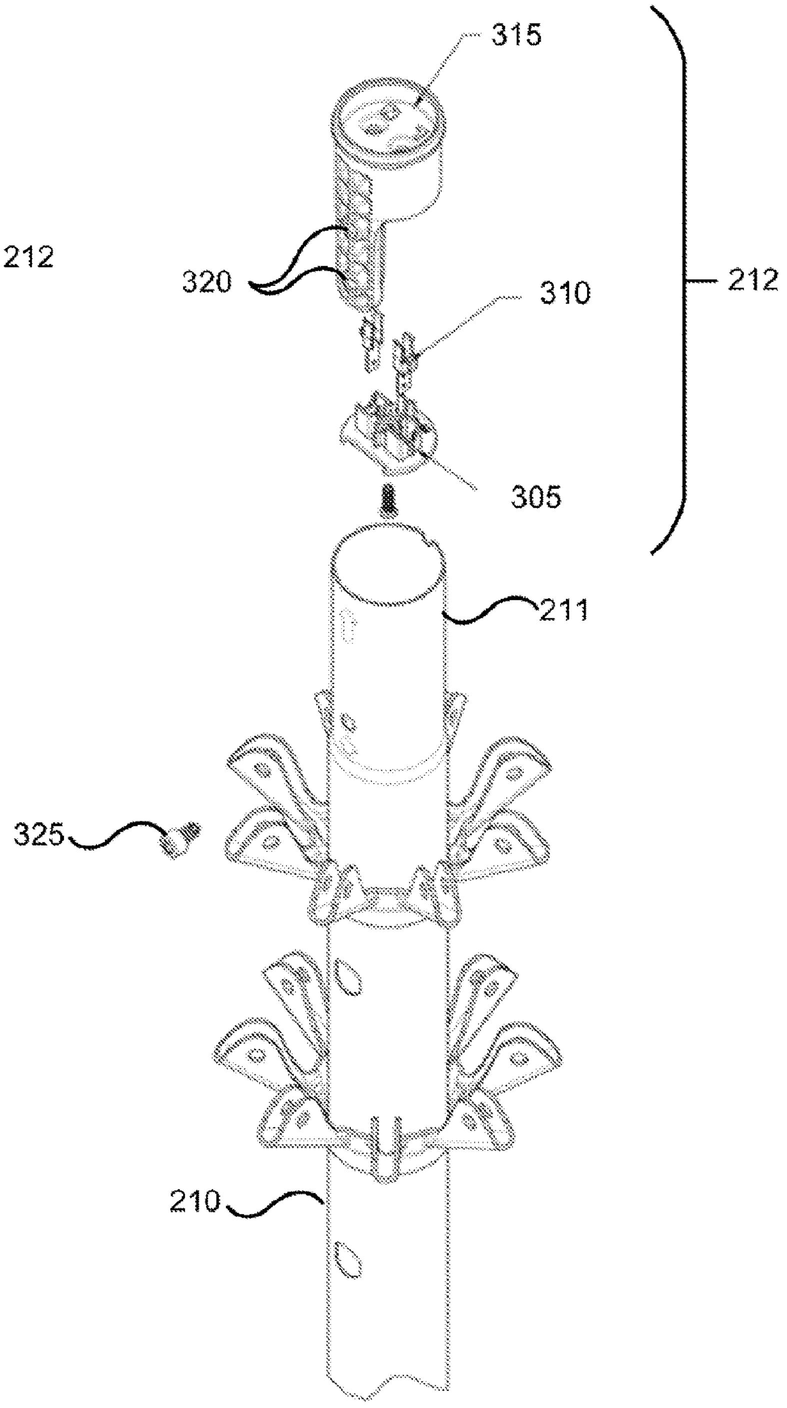
FIG. 3B depicts an exploded perspective view of a male end of a trunk section, in accordance with some embodiments of the present disclosure.
Figure 4A:
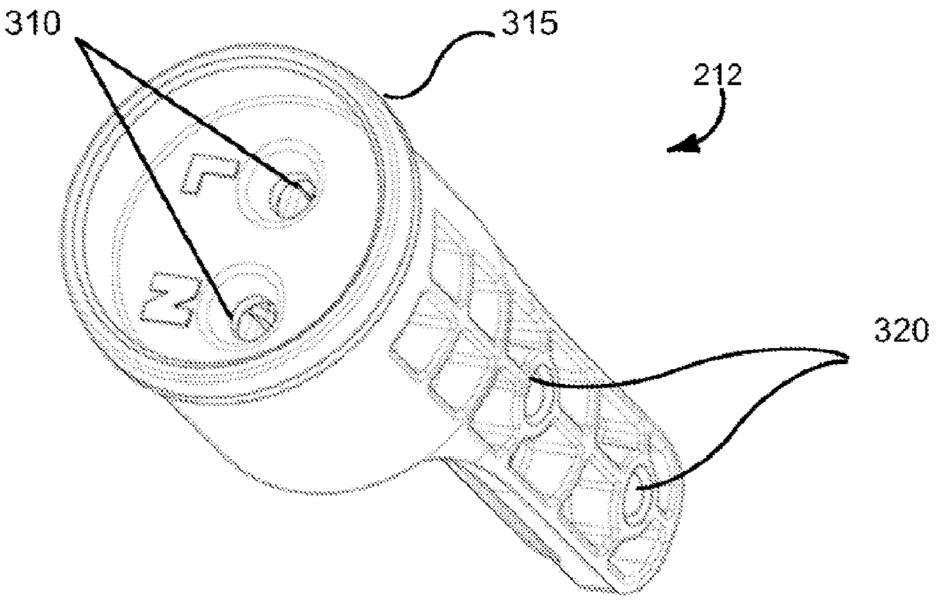
FIGS. 4A and 4B depict perspective views of a female electrical connector, in accordance with some embodiments of the present disclosure.
Figure 4B:
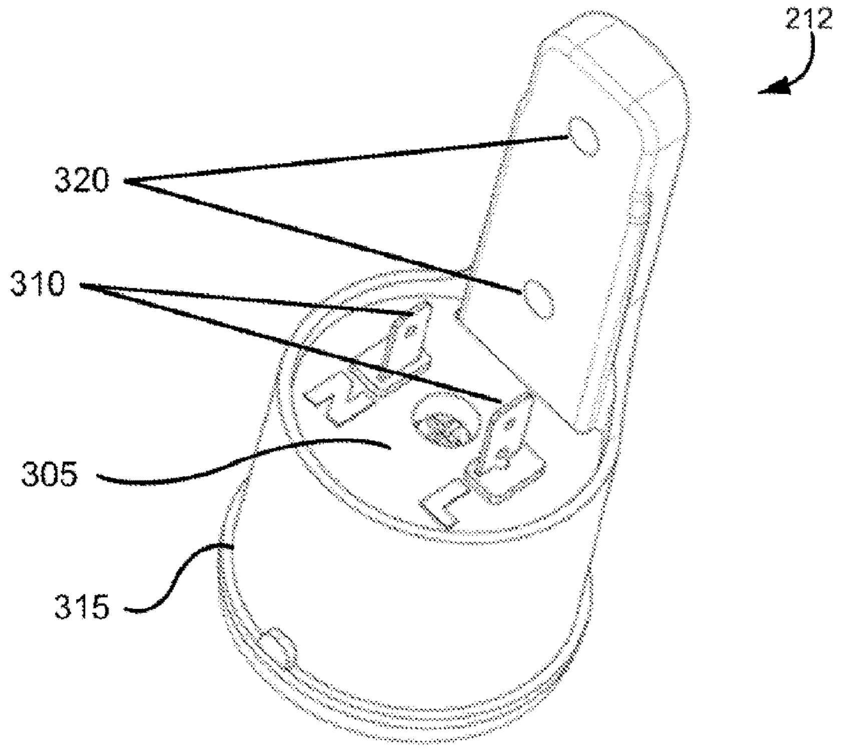
Figure 4C:
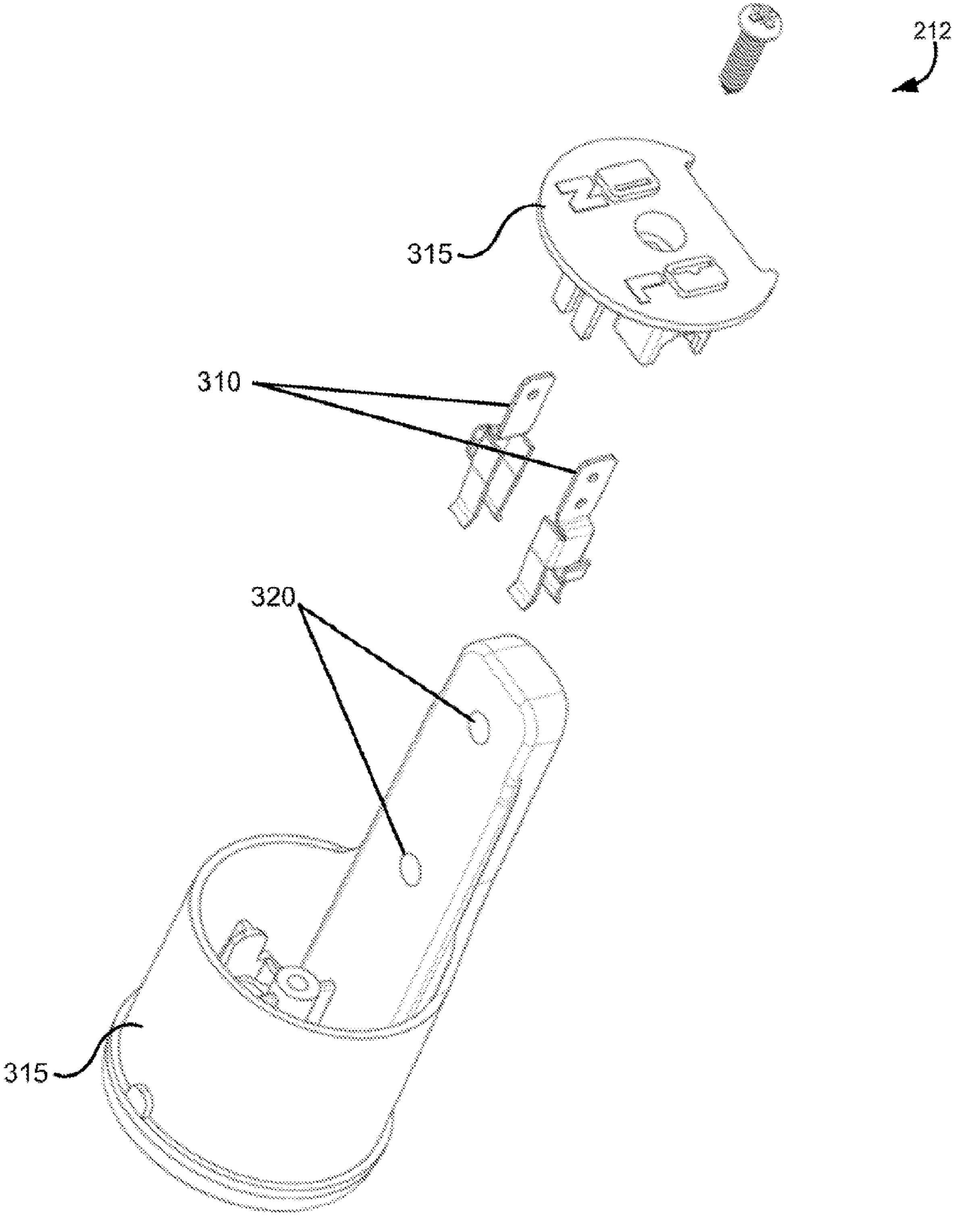
FIG. 4C depicts an exploded perspective views of a female electrical connector, in accordance with some embodiments of the present disclosure.

FIG. 3A depicts a perspective view of a male end of a trunk section 211 having a female electrical connector 212 installed therein, in accordance with some embodiments of the present disclosure. FIG. 3B depicts an exploded perspective view of a male end of a trunk section 211, in accordance with some embodiments of the present disclosure. As depicted, trunk section 210 can include a first end 213 and a second end 211. Second end 211 comprises a male end configured to mate with a female end of a different trunk section. Female electrical connector 212 comprises a main housing 315, a contact set 310, securing member 305 and an anti-rotation member 325. The anti-rotation member 325 can be a screw or a bolt. The anti-rotation member 325 can extend through a wall of the first trunk section 210. The anti-rotation member 325 can extend through both the wall of the first trunk section 210 and a portion 320 of the female connector 212 that extends into an internal portion of the first trunk section 210. In some embodiments, anti-rotation member 325 can be a rolling anti-rotation member configured to spin and maintain connection to the connector 212. FIGS. 4A and 4B depict additional perspective views of a female electrical connector 212 and FIG. 4C depicts an exploded perspective views of a female electrical connector 212.

Figure 5A:
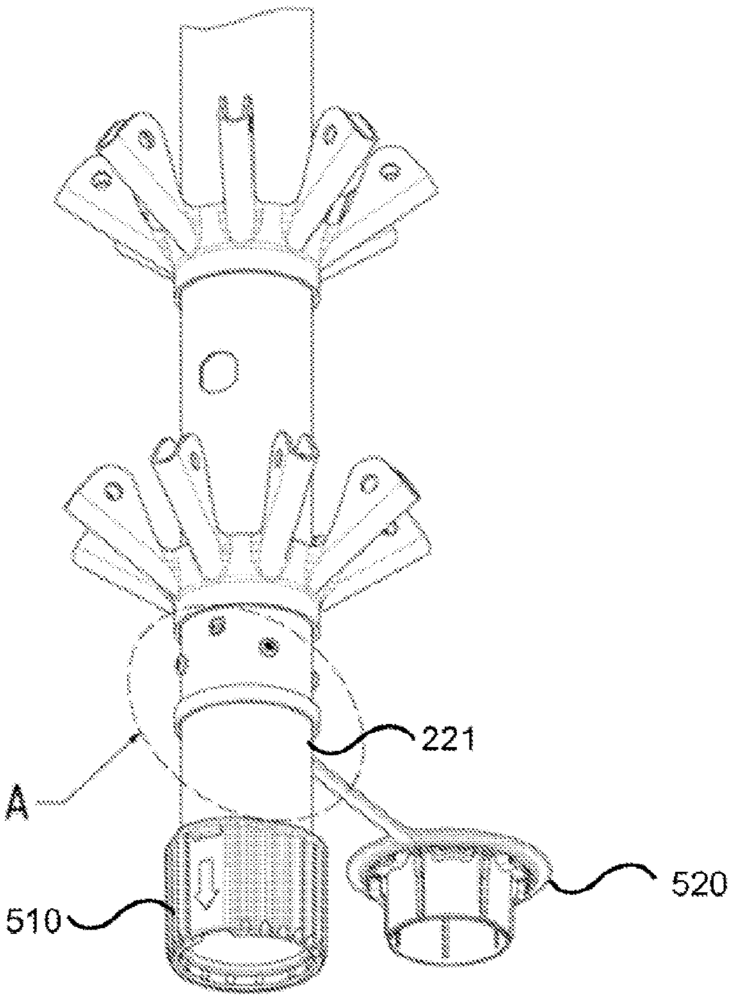
FIG. 5A depicts a perspective view of a female end of a trunk section having a male connector installed therein, in accordance with some embodiments of the present disclosure.
Figure 5B:
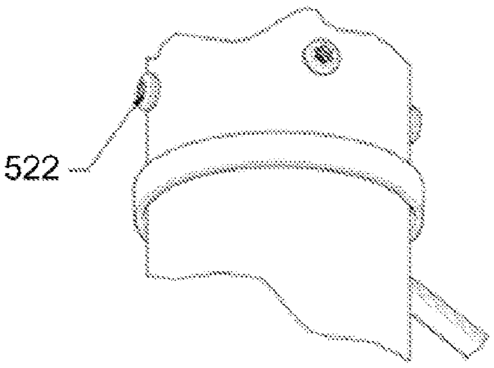
FIG. 5B depicts a magnified perspective view of a female end of a trunk section having a male connector installed therein, particularly of area A indicated in FIG. 5A, in accordance with some embodiments of the present disclosure.
Figure 5C:
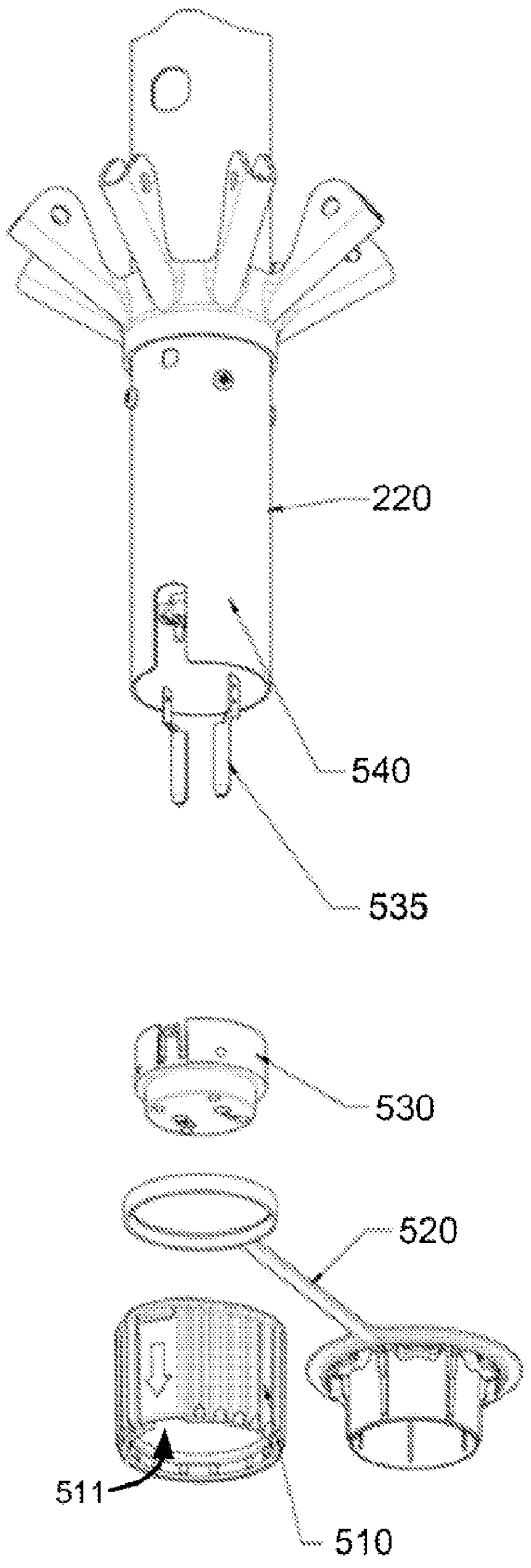
FIG. 5C depicts an exploded perspective view of a female end of a trunk section, in accordance with some embodiments of the present disclosure.

FIG. 5A depicts a perspective view of a female end of a trunk section 221 having a male connector 222 installed therein and a collar 510 installed thereon, in accordance with some embodiments of the present disclosure. FIG. 5B depicts a magnified perspective view of a female end of a trunk section 221 having a male connector 222 installed therein, particularly of area A indicated in FIG. 5A, in accordance with some embodiments of the present disclosure. FIG. 5C depicts an exploded perspective view of a female end of a trunk section 221, in accordance with some embodiments of the present disclosure. As depicted, trunk section 220 can include a first end 221 that comprises a female end configured to mate with a male end of a different trunk section. As further depicted, first end 221 includes a male electrical connector 222, a collar 510, and an endcap 520. Male electrical connector 222 comprises a main housing 530, a contact set 535, and securing member 540. Male electrical connector 222 can be configured to mate with female electrical connector 212 such that electrical contact set 310 mates with electrical contact set 535. As depicted the respective electrical contact sets include two electrical contacts, however the contact sets may include more or less contacts. For example, and as further depicted and described herein, contact sets may include 2, 3, 4, 5, 6, or more contacts. The female electrical connector 212 can also comprise additional electrical contact sets besides the electrical contact set 310. For example, the female electrical connector 212 can have 2, 3, 4, 5, 6, or more electrical contact sets, and each of the electrical contact sets can include 2, 3, 4, 5, 6, or more contacts. Furthermore, the electrical contact set 310 can be positioned at various positions and/or orientations within the female electrical connector 212. The male electrical connector 222 can also comprise additional electrical contact sets besides the electrical contact set 535. The additional electrical contact sets can correspond to the electrical contact sets in the female electrical connector 212. For example, the male electrical connector 222 can have 2, 3, 4, 5, 6, or more electrical contact sets, and each of the electrical contact sets can include 2, 3, 4, 5, 6, or more contacts. Furthermore, the electrical contact set 535 can be positioned at various positions and/or orientations within the male electrical connector 222.

Figure 6A:
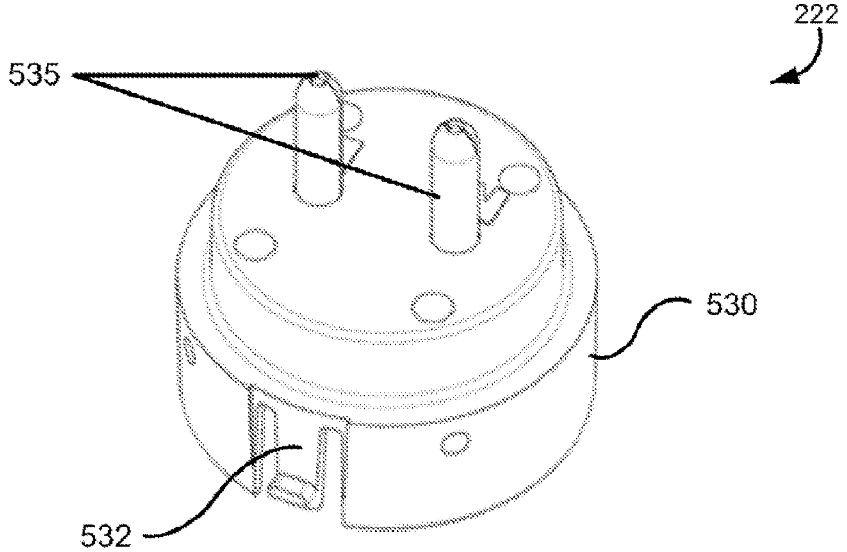
FIGS. 6A and 6B depict perspective views of a male electrical connector, in accordance with some embodiments of the present disclosure.
Figure 6B:
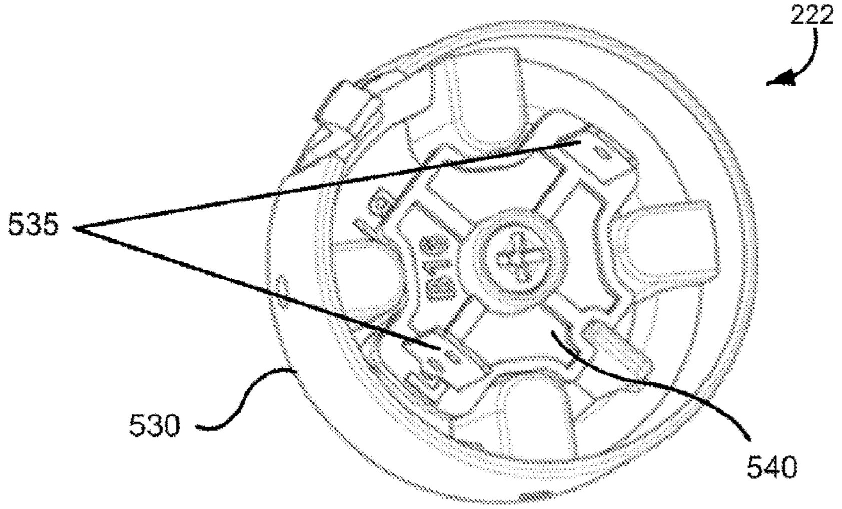
Figure 6C:
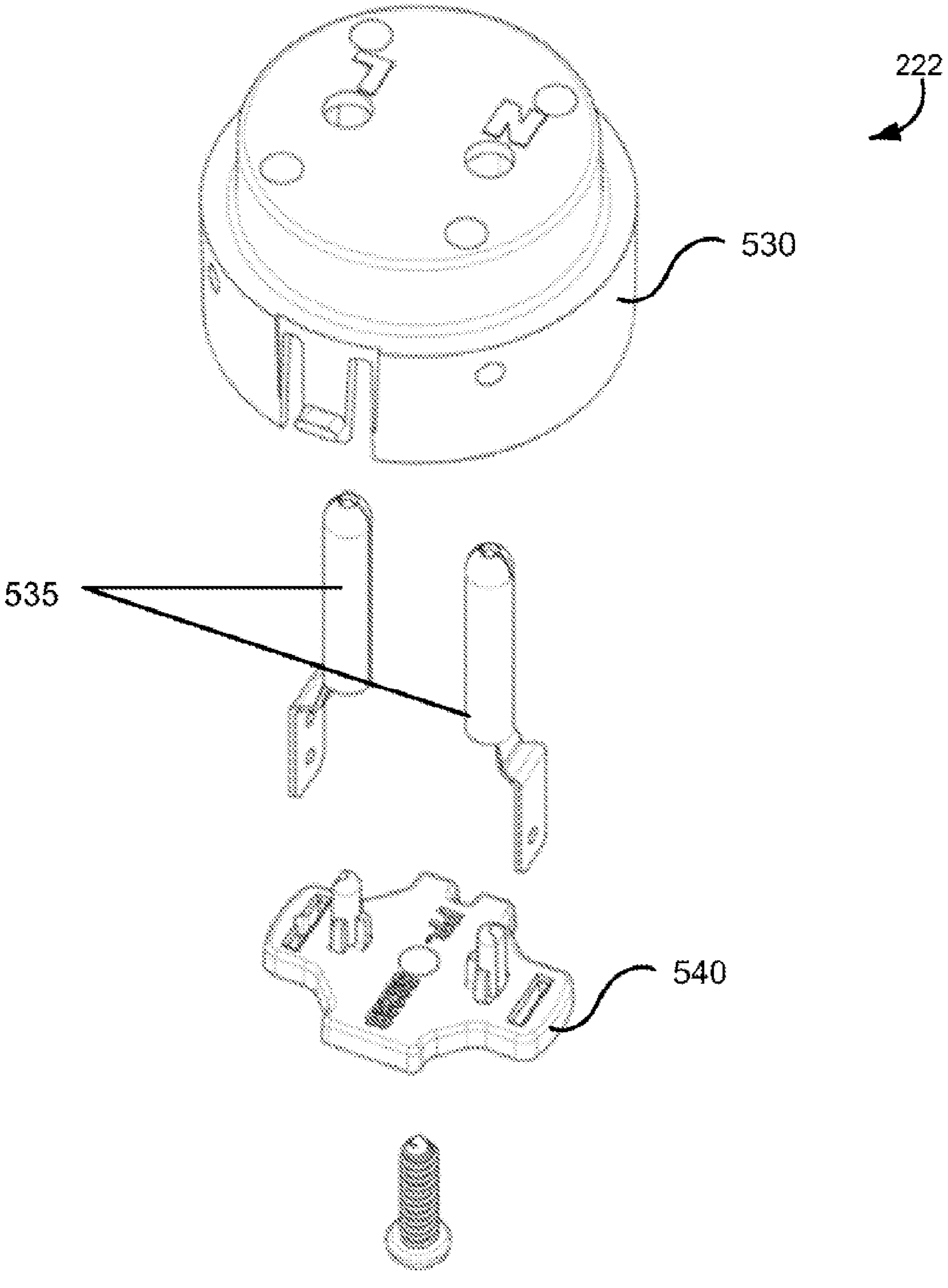
FIG. 6C depicts an exploded perspective views of a male electrical connector, in accordance with some embodiments of the present disclosure.

Further, and as depicted in FIG. 5B, male electrical connector 222 can be configured to be secured within trunk section 220. For example, male electrical connector 222 can include one or more cavity and may be secured to the trunk 220 via external fasteners 522 (e.g., screws, bolts, etc.). As another example, male electrical connector 222 can include one or more integral fastening mechanism 532 (e.g., tabs, etc.). Further, FIGS. 6A and 6B depict additional perspective views of a male electrical connector 222 and FIG. 6C depicts an exploded perspective views of a male electrical connector 222.

As further depicted, collar 510 can include a recess 511. The recess 511 can be configured to receive the anti-rotation member 325. Thus, mating the collar 510 with the anti-rotation member 325 of the female electrical connector 212 can restrict rotation of the first trunk section 210 relative the second trunk section 220 and vice versa. This can be useful in many scenarios. For example, the anti-rotation member 325 of the female electrical connector 212 and the recess 511 of the collar 510 can be useful as an alignment mechanism to align the electrical contacts of the trunk sections 210, 220. Further, the anti-rotation member 325 and the recess 511 can prevent subsequent rotation or twisting, which could otherwise damage the electrical contacts.

An alternative embodiment of a collar 510 can include an angled region that facilitates assembly of an artificial tree. The angled portion of the collar 510 can slope downward at an angle of less than ninety degrees from a longitudinal axis. In one embodiment, the angled portion of the collar 510 can be at an angle of between approximately thirty degrees and fifty degrees from the longitudinal axis. The combination of the angled collar 510 and the anti-rotation member 325 can facilitate assembly of an artificial tree, especially in an embodiment where the anti-rotation member 325 is a rolling anti-rotation member. For example, the angled portion of the collar 510 can disperse the force of weight of the second trunk section 220. Unlike a flat first end of a collar 510 that directs the force of weight of a second trunk section 220 directly down, an angled first end converts a portion of the force of weight from directly down to parallel with the angled portion. The decreased downward force of weight of the second trunk section 220 can also result in less friction between the anti-rotation member 325 and the collar 510. This reduced friction can further facilitate rotation of the second trunk section 220 during tree assembly. For example, the reduced friction can facilitate the rotation required to align the anti-rotation member with the recess 511.

Figure 7A:
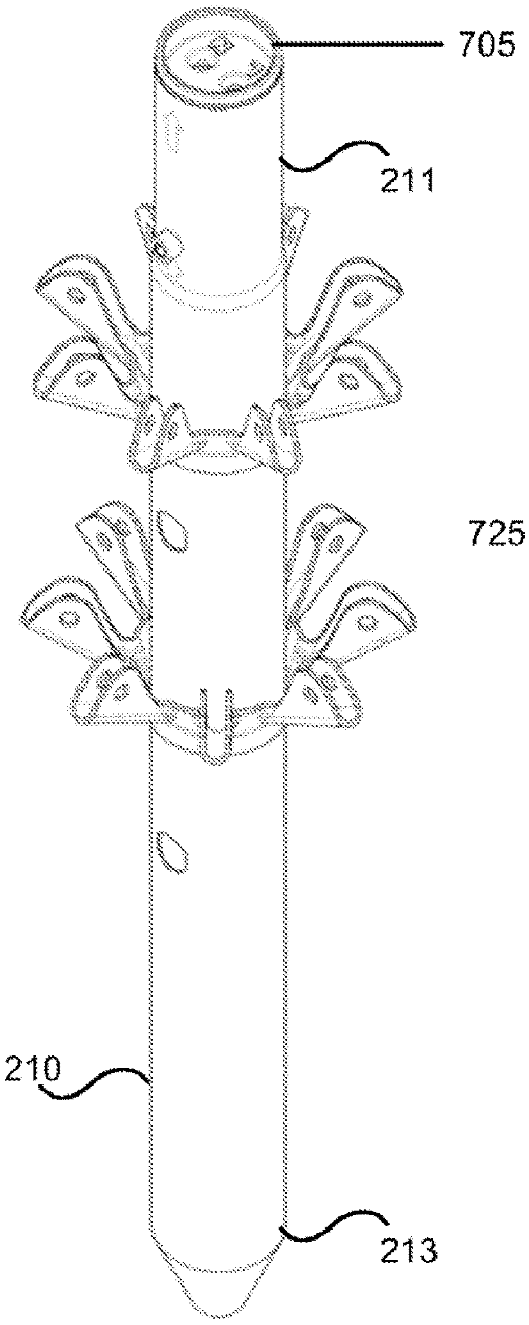
FIG. 7A depicts a perspective view of a male end of a trunk section having a female electrical connector installed therein, in accordance with some embodiments of the present disclosure.
Figure 7B:
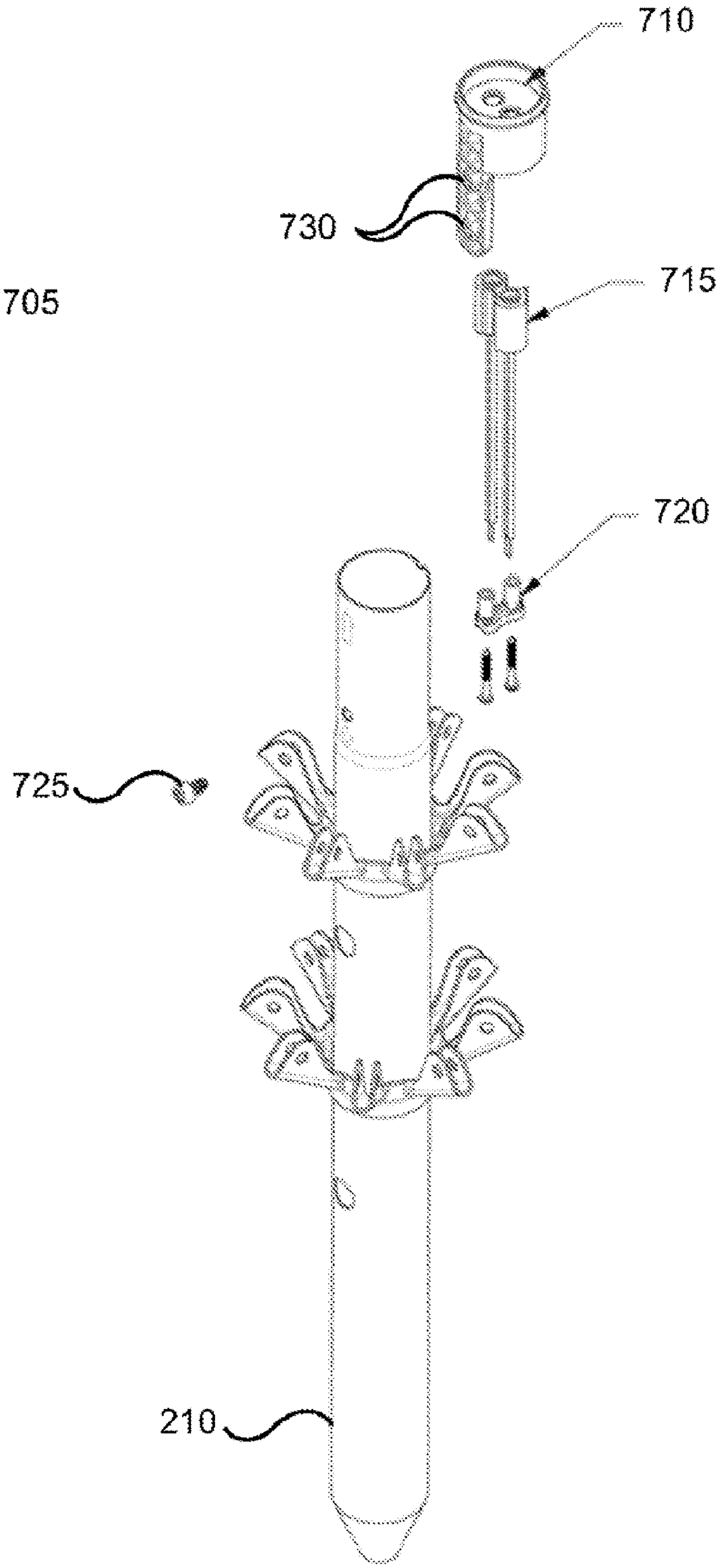
FIG. 7B depicts an exploded perspective view of a male end of a trunk section, in accordance with some embodiments of the present disclosure.
Figure 8A:
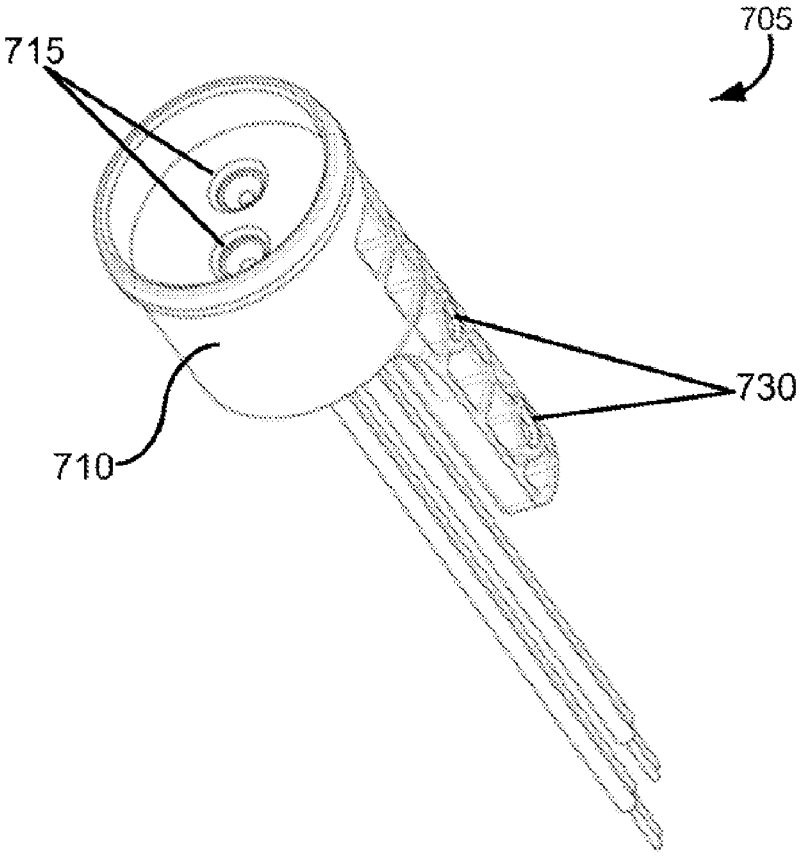
FIGS. 8A and 8B depict perspective views of a female electrical connector, in accordance with some embodiments of the present disclosure.
Figure 8B:
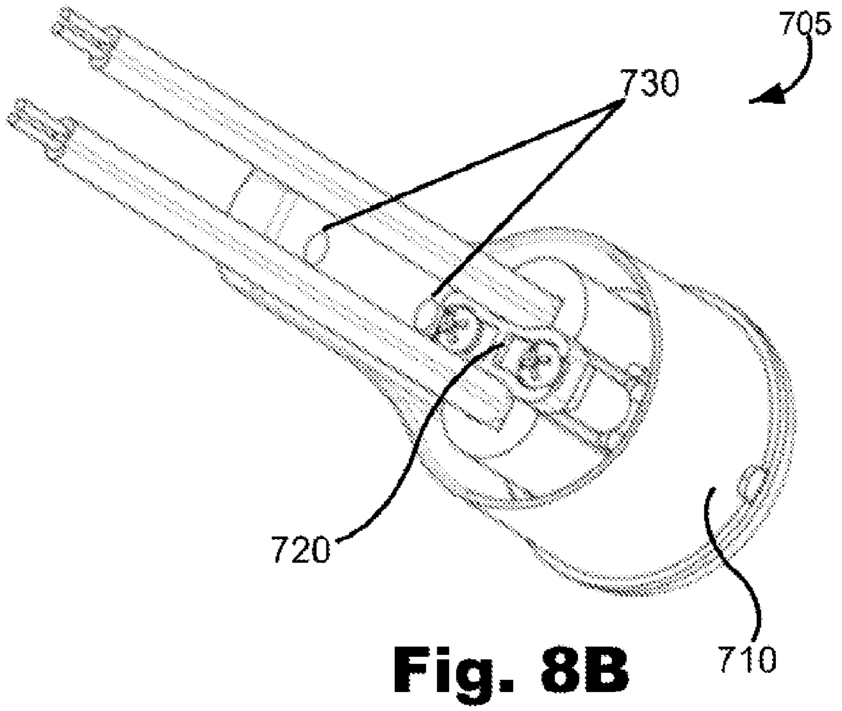
Figure 8C:
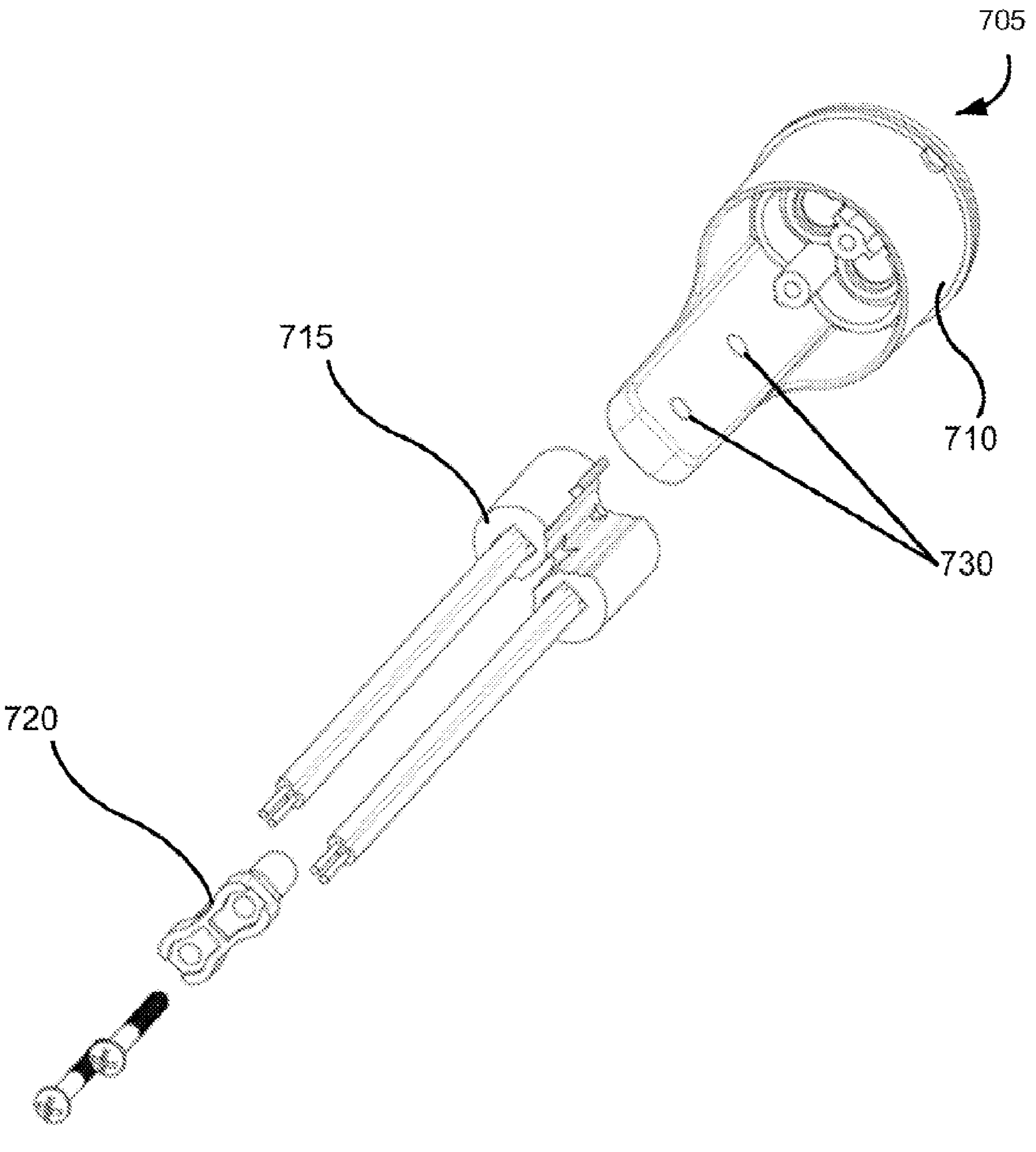
FIG. 8C depicts an exploded perspective views of a female electrical connector, in accordance with some embodiments of the present disclosure.

FIG. 7A depicts a perspective view of a male end of a trunk section 211 having a female electrical connector 705 installed therein, in accordance with some embodiments of the present disclosure. FIG. 7B depicts an exploded perspective view of a male end of a trunk section 211, in accordance with some embodiments of the present disclosure. As depicted, trunk section 210 can include a first end 213 and a second end 211. Second end 211 comprises a male end configured to mate with a female end of a different trunk section. Female electrical connector 705 comprises a main housing 710, an electrical contact assembly 715, securing member 720, and an anti-rotation member 725. The anti-rotation member 725 can be a screw or a bolt. The anti-rotation member 725 can extend through a wall of the first trunk section 210. The anti-rotation member 725 can extend through both the wall of the first trunk section 210 and a portion 730 of the female connector 705 that extends into an internal portion of the first trunk section 210. In some embodiments, anti-rotation member 725 can be a rolling anti-rotation member configured to spin and maintain connection to the connector 705. FIGS. 8A and 8B depict additional perspective views of a female electrical connector 705 and FIG. 8C depicts an exploded perspective views of a female electrical connector 705.

Figure 9A:
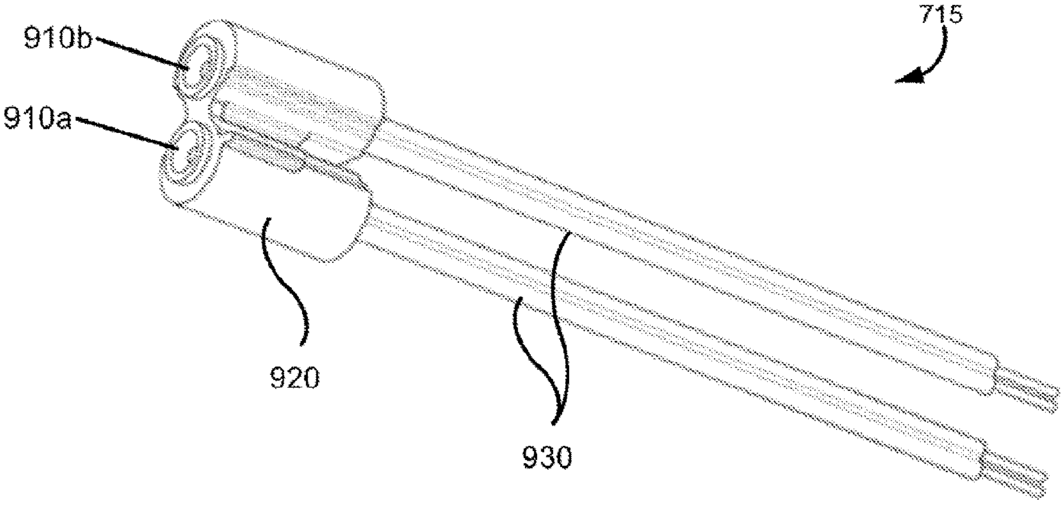
FIG. 9A depicts a perspective view of a female electrical contact assembly, in accordance with some embodiments of the present disclosure.
Figure 9B:
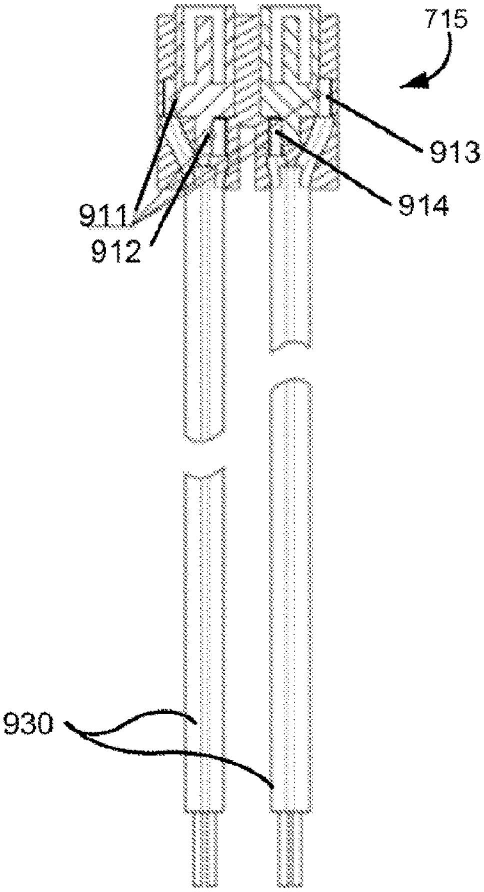
FIG. 9B depicts a cross section view of a female electrical contact assembly, in accordance with some embodiments of the present disclosure.
Figure 9C:
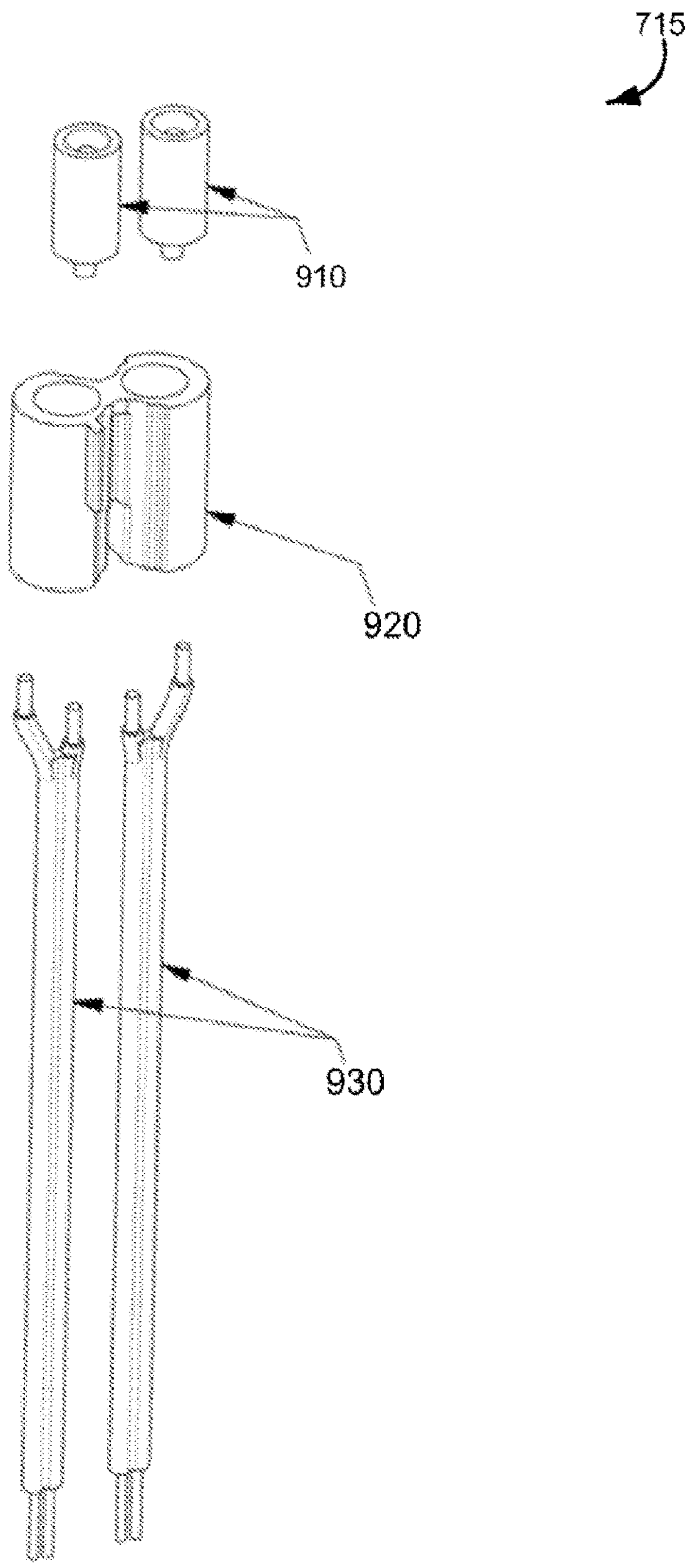
FIG. 9C depicts an exploded view of a female electrical contact assembly, in accordance with some embodiments of the present disclosure.

FIG. 9A depicts a perspective view of a female electrical contact assembly 715, in accordance with some embodiments of the present disclosure. FIG. 9B depicts a cross section view of a female electrical contact assembly 715, in accordance with some embodiments of the present disclosure. FIG. 9C depicts an exploded view of a female electrical contact assembly 715, in accordance with some embodiments of the present disclosure. As depicted, female electrical contact assembly 715 comprises one or more electrical contact sets 910. As shown, electrical contact sets 910*a,b* include respective pluralities of electrical contacts. Specifically, contact set 910*a* includes a first electrical contact 911 that encircles a second electrical contact 912 and contact set 910*b* includes a third electrical contact 913 that encircles a fourth electrical contact 914. As will be appreciated other numbers of electrical contacts and configurations can be included. Further, the position and/or orientation of the electrical contacts can be altered as desired. As further depicted, contact sets 910*a,b* are configured to be received by in a first end of insulating member 920. Further, the second end of the insulating member 920 can be configured to receive a plurality of wires of a wiring harness 930 of the artificial tree.

Figure 10A:
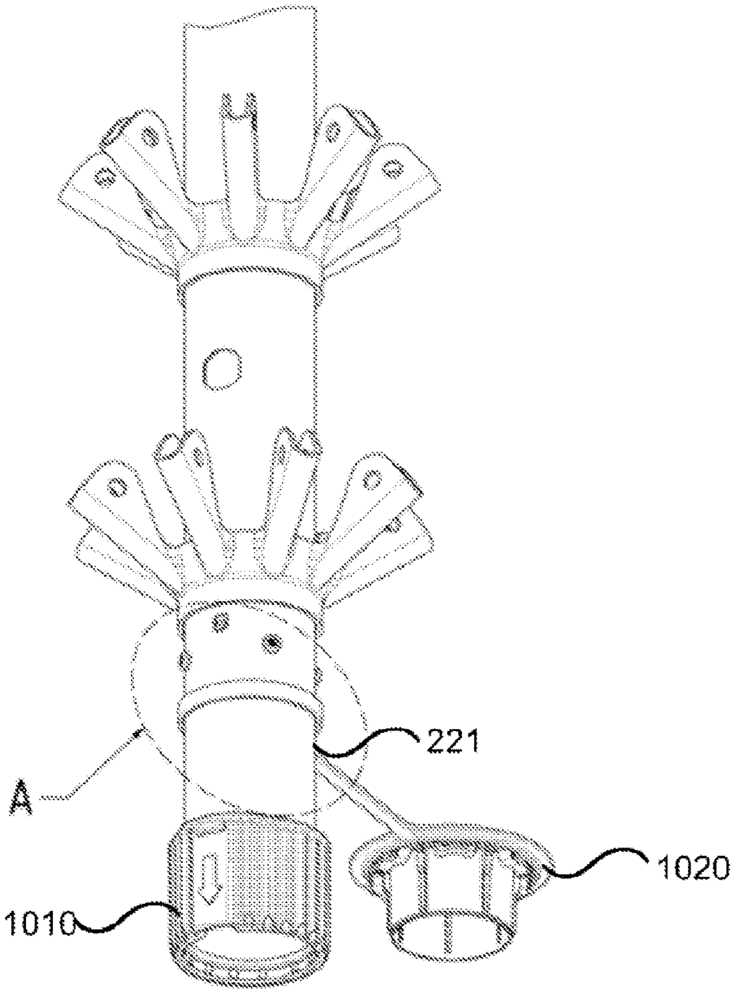
FIG. 10A depicts a perspective view of a female end of a trunk section having a male connector installed therein, in accordance with some embodiments of the present disclosure.
Figure 10B:
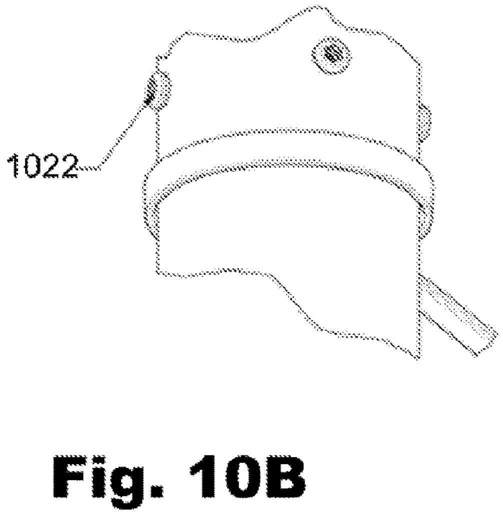
FIG. 10B depicts a magnified perspective view of a female end of a trunk section having a male connector installed therein, particularly of area A indicated in FIG. 5A, in accordance with some embodiments of the present disclosure.
Figure 10C:
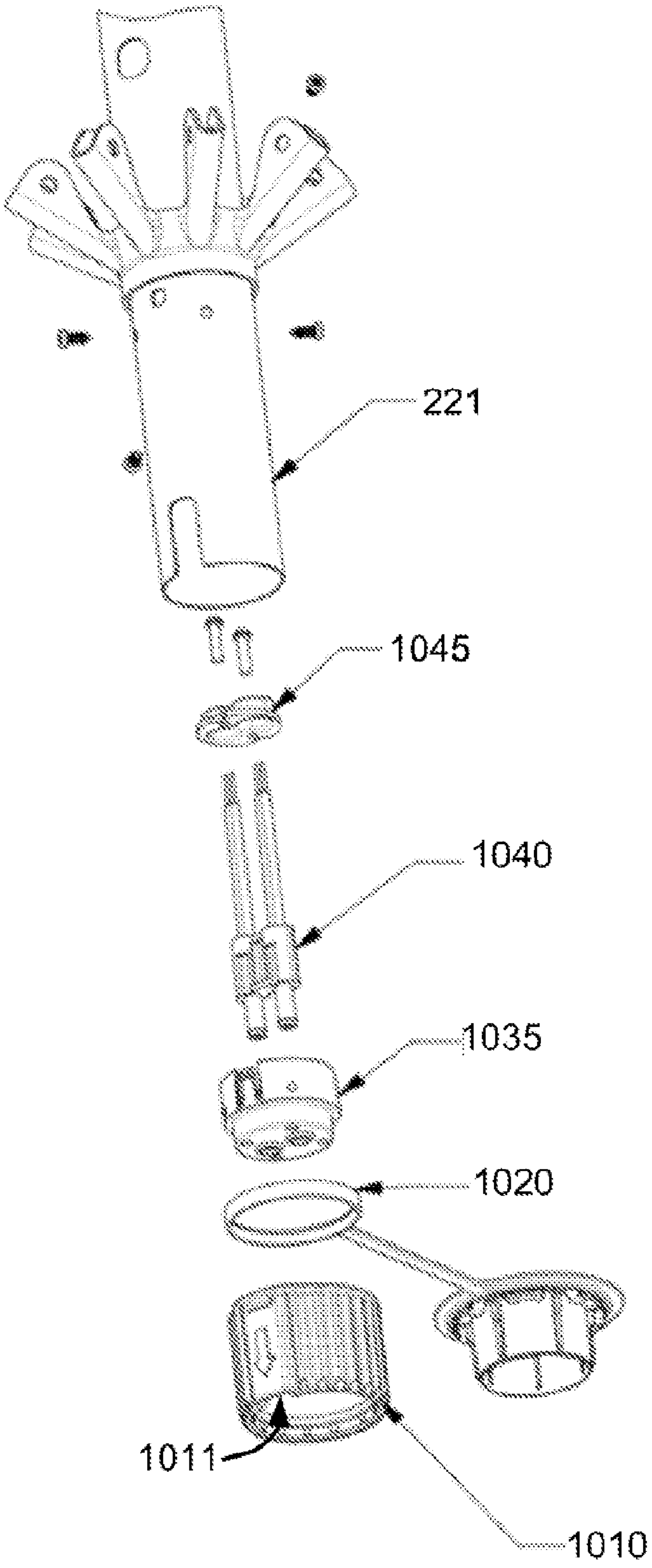
FIG. 10C depicts an exploded perspective view of a female end of a trunk section, in accordance with some embodiments of the present disclosure.
Figure 11A:
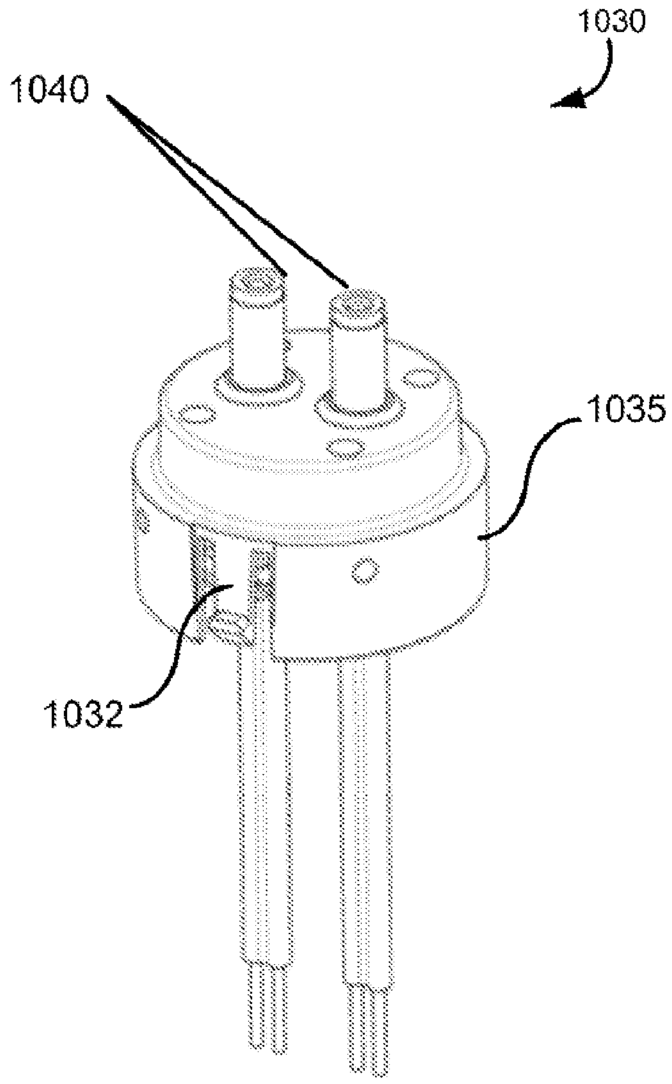
FIGS. 11A and 11B depict perspective views of a male electrical connector, in accordance with some embodiments of the present disclosure.
Figure 11B:
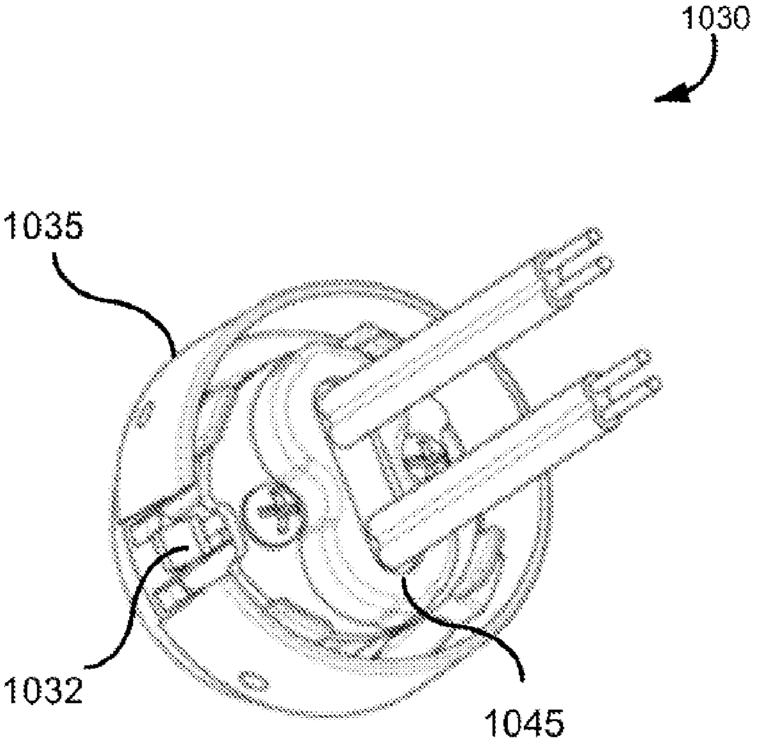
Figure 11C:
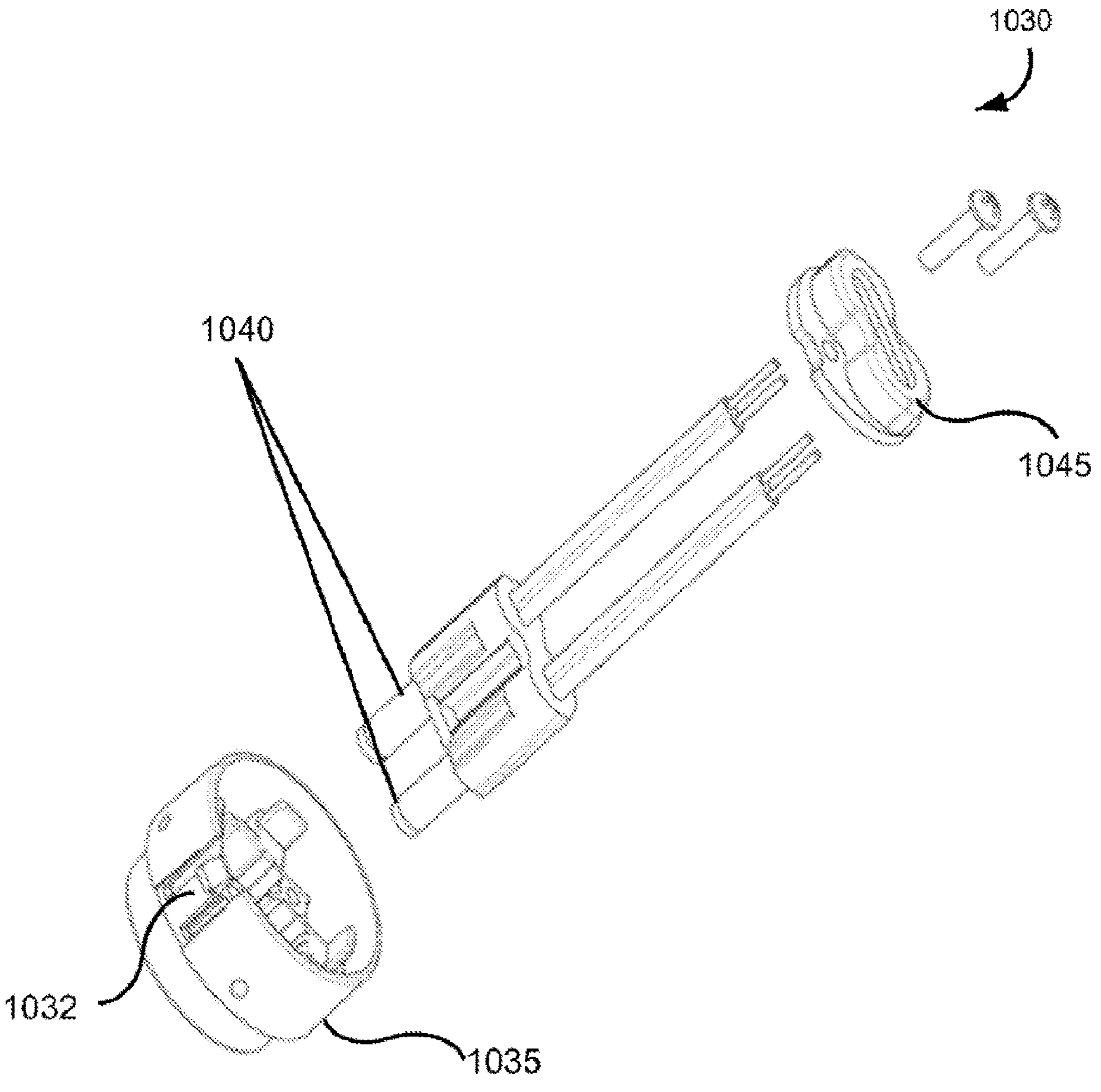
FIG. 11C depicts an exploded perspective views of a male electrical connector, in accordance with some embodiments of the present disclosure.

FIG. 10A depicts a perspective view of a female end of a trunk section 221 having a male connector 1030 installed therein, in accordance with some embodiments of the present disclosure. FIG. 10B depicts a magnified perspective view of a female end of a trunk section 221 having a male connector 1030 installed therein, particularly of area A indicated in FIG. 5A, in accordance with some embodiments of the present disclosure. FIG. 10C depicts an exploded perspective view of a female end of a trunk section 221, in accordance with some embodiments of the present disclosure. As depicted, trunk section 220 can include a first end 221 that comprises a female end configured to mate with a male end of a different trunk section. As further depicted, first end 221 includes a male electrical connector 1030, a collar 1010, and an endcap 1020. Male electrical connector 1030 comprises a main housing 1035, a male electrical contact assembly 1040, and a securing member 1045. Male electrical connector 1030 can be configured to mate with female electrical connector 705 such that electrical contact sets 910*a,b* mates with electrical contacts of male electrical contact assembly 1040. Further, and as depicted in FIG. 10B, male electrical connector 1030 can be configured to be secured within trunk section 220. For example, male electrical connector 1030 can include one or more cavity and may be secured to the trunk 220 via external fasteners 1022 (e.g., screws, bolts, etc.). As another example, male electrical connector 1030 can include one or more integral fastening mechanism 1032 (e.g., tabs, etc.). Further, FIGS. 11A and 11B depict additional perspective views of a male electrical connector 1030 and FIG. 11C depicts an exploded perspective views of a male electrical connector 1030.

As further depicted, collar 1010 can include a recess 1011. The recess 1011 can be configured to receive the anti-rotation member 725. Thus, mating the collar 1010 with the anti-rotation member 725 of the female electrical connector 705 can restrict rotation of the first trunk section 210 relative the second trunk section 220 and vice versa. This can be useful in many scenarios. For example, the anti-rotation member 725 of the female electrical connector 705 and the recess 1011 of the collar 1010 can be useful as an alignment mechanism to align the electrical contacts of the trunk sections 210, 220. Further, the anti-rotation member 725 and the recess 1011 can prevent subsequent rotation or twisting, which could otherwise damage the electrical contacts.

An alternative embodiment of a collar 1010 can include an angled region that facilitates assembly of an artificial tree. The angled portion of the collar 1010 can slope downward at an angle of less than ninety degrees from a longitudinal axis. In one embodiment, the angled portion of the collar 1010 can be at an angle of between approximately thirty degrees and fifty degrees from the longitudinal axis. The combination of the angled collar 1010 and the anti-rotation member 725 can facilitate assembly of an artificial tree, especially in an embodiment where the anti-rotation member 725 is a rolling anti-rotation member. For example, the angled portion of the collar 1010 can disperse the force of weight of the second trunk section 220. Unlike a flat first end of a collar 1010 that directs the force of weight of a second trunk section 220 directly down, an angled first end converts a portion of the force of weight from directly down to parallel with the angled portion. The decreased downward force of weight of the second trunk section 220 can also result in less friction between the anti-rotation member 725 and the collar 1010. This reduced friction can further facilitate rotation of the second trunk section 220 during tree assembly. For example, the reduced friction can facilitate the rotation required to align the anti-rotation member with the recess 1011.

Figure 12A:
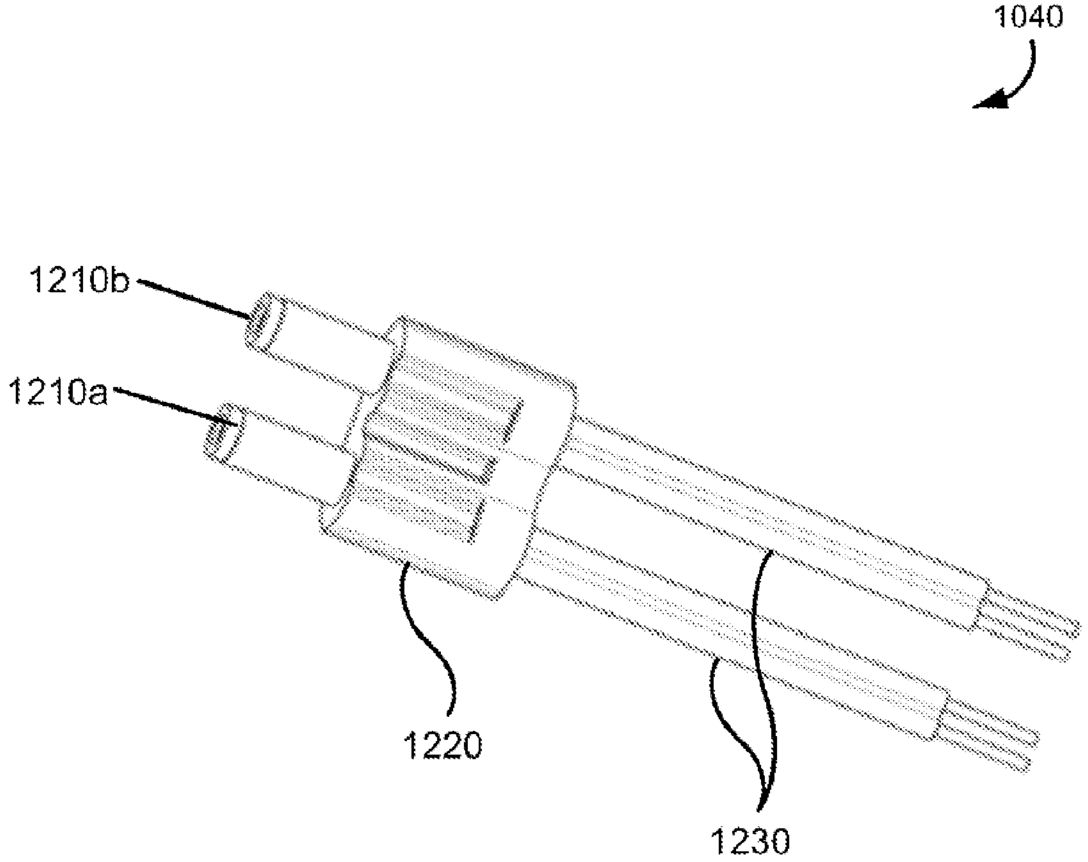
FIG. 12A depicts a perspective view of a male electrical contact assembly, in accordance with some embodiments of the present disclosure.
Figure 12B:
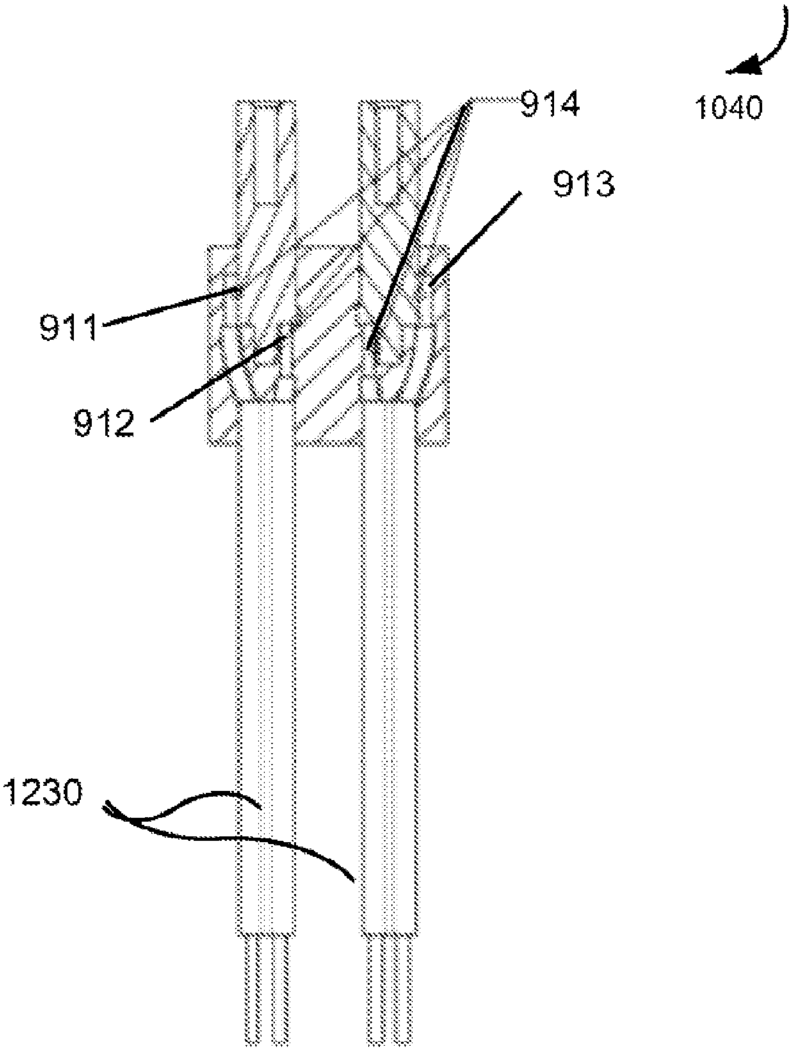
FIG. 12B depicts a cross section view of a male electrical contact assembly, in accordance with some embodiments of the present disclosure.
Figure 12C:
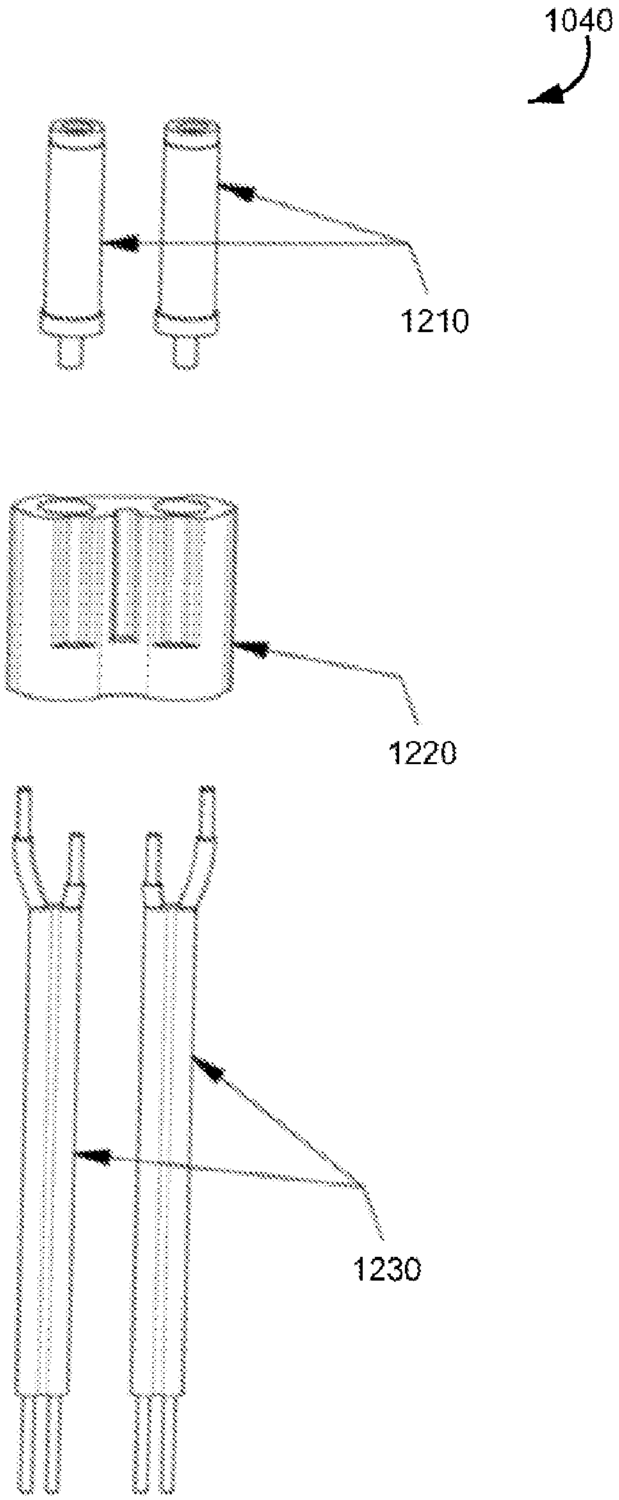
FIG. 12C depicts an exploded view of a male electrical contact assembly, in accordance with some embodiments of the present disclosure.

FIG. 12A depicts a perspective view of a male electrical contact assembly 1040, in accordance with some embodiments of the present disclosure. FIG. 12B depicts a cross section view of a male electrical contact assembly 1040, in accordance with some embodiments of the present disclosure. FIG. 12C depicts an exploded view of a male electrical contact assembly 1040, in accordance with some embodiments of the present disclosure. As depicted, male electrical contact assembly 1040 comprises one or more electrical contact sets 1210. As shown, electrical contact sets 12100*a,b* include respective pluralities of electrical contacts. Specifically, contact set 1210*a* includes a first electrical contact 1211 that encircles a second electrical contact 1212 and contact set 1210*b* includes a third electrical contact 1213 that encircles a fourth electrical contact 1214. As will be appreciated other numbers of electrical contacts and configurations can be included. As further depicted, contact sets 1210*a,b* are configured to be received by in a first end of insulating member 1220. Further, the second end of the insulating member 1220 can be configured to receive a plurality of wires of a wiring harness 1230 of the artificial tree.

Figure 13A:
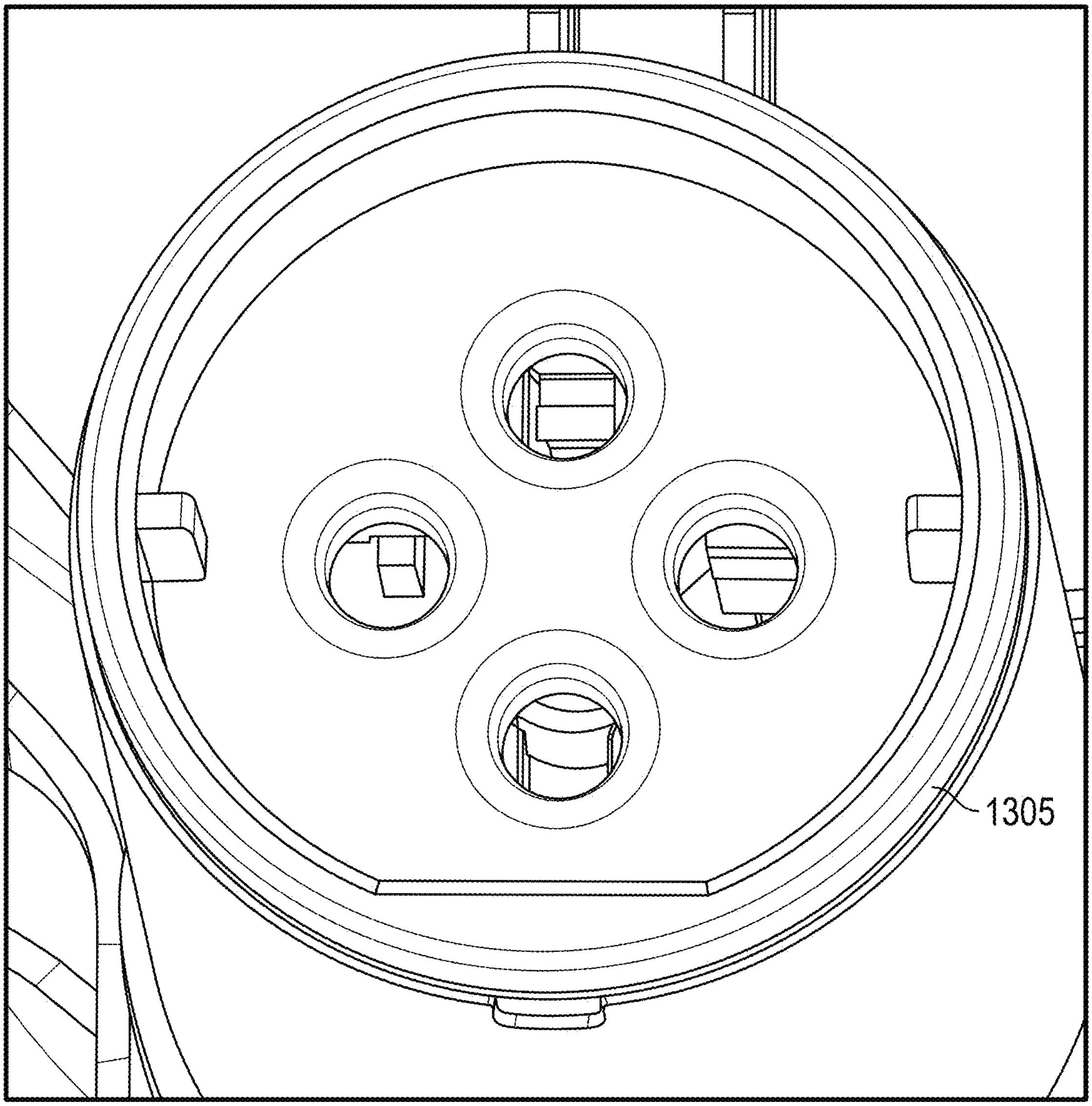
FIG. 13A depicts a perspective view of a female end of a trunk section having a female connector installed therein, in accordance with some embodiments of the present disclosure.
Figure 13B:
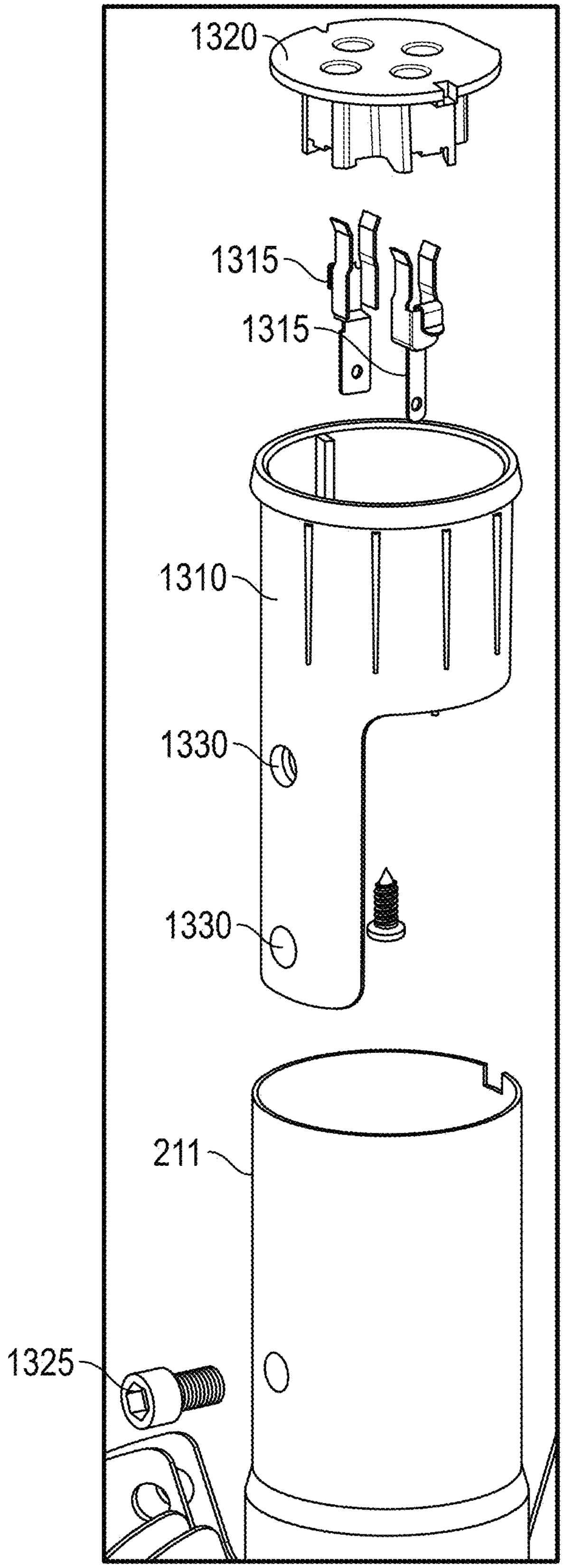
FIG. 13B depicts an exploded perspective view of a female end of a trunk section, in accordance with some embodiments of the present disclosure.

FIG. 13A depicts a perspective view of a female end of a trunk section 211 having a female connector installed 1305 therein, in accordance with some embodiments of the present disclosure. FIG. 13B depicts an exploded perspective view of a female end of a trunk section 211, in accordance with some embodiments of the present disclosure. As depicted, trunk section 210 can include a first end 211. First end 211 comprises a male end configured to mate with a female end of a different trunk section. Female electrical connector 1305 comprises a main housing 1310, a contact set 1315, securing member 1320 and an anti-rotation member 1325. The anti-rotation member 1325 can be a screw or a bolt. The anti-rotation member 1325 can extend through a wall of the first trunk section 210. The anti-rotation member 1325 can extend through both the wall of the first trunk section 210 and a portion 1330 of the female connector 1305 that extends into an internal portion of the first trunk section 210. In some embodiments, anti-rotation member 1325 can be a rolling anti-rotation member configured to spin and maintain connection to the connector 1305.

Figure 14A:
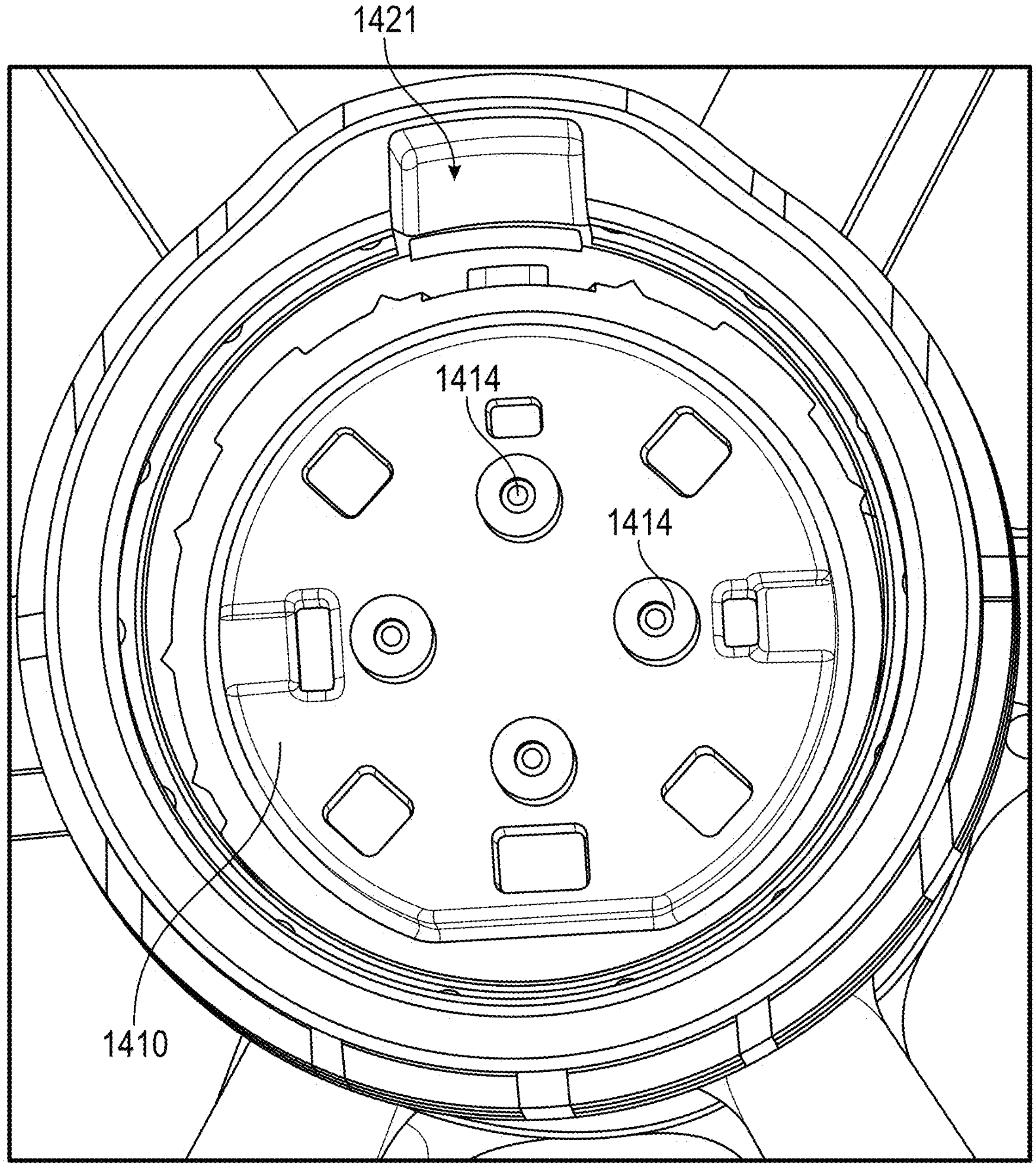
FIG. 14A depicts a perspective view of a male end of a trunk section having a male electrical connector installed therein, in accordance with some embodiments of the present disclosure.
Figure 14B:
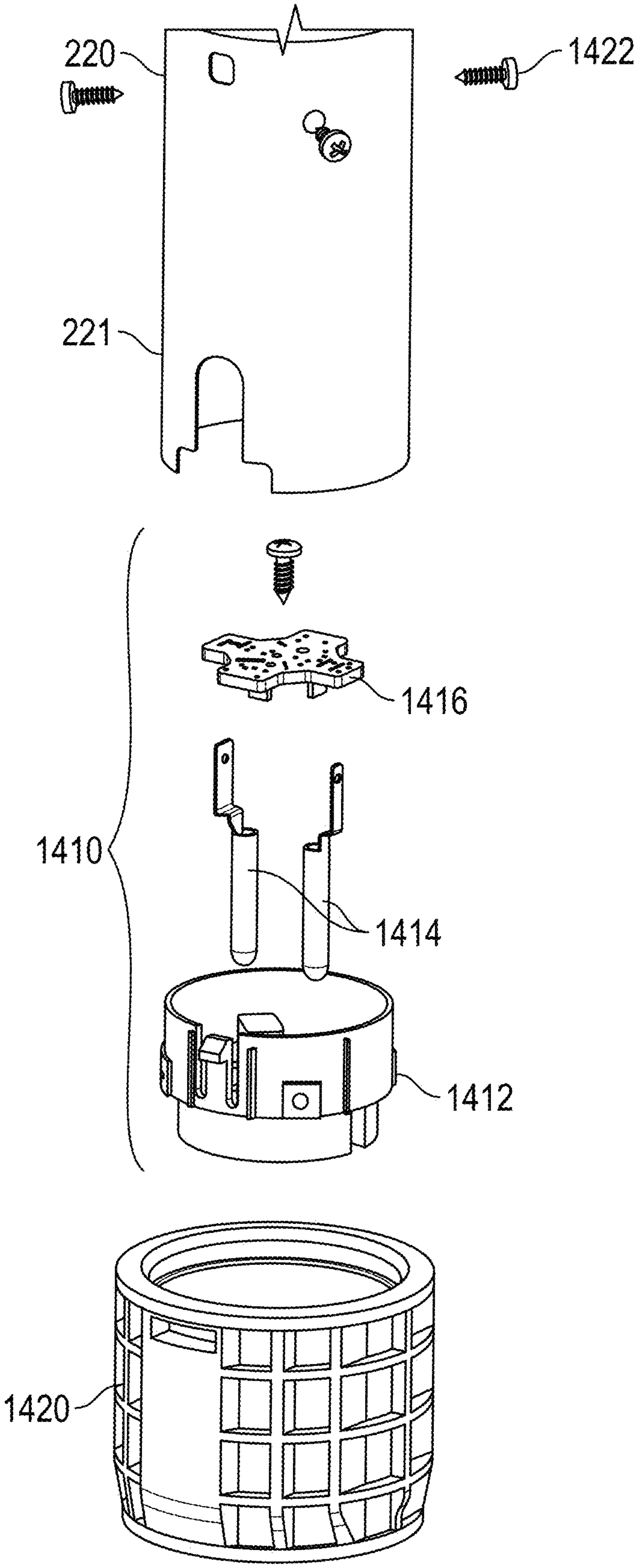
FIG. 14B depicts an exploded perspective view of a male end of a trunk section, in accordance with some embodiments of the present disclosure.
Figure 15:
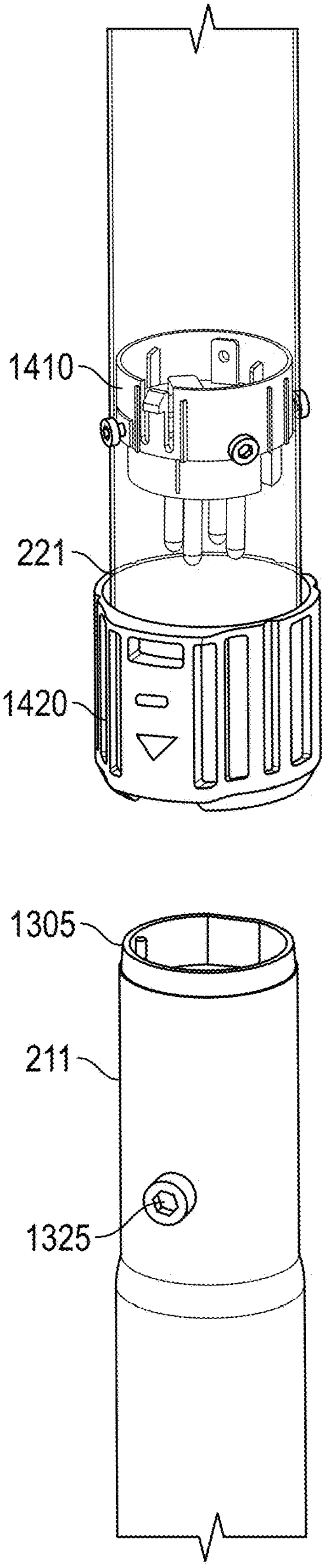
FIG. 15 depicts an exploded view perspective view of a male end of a trunk section aligned with a female end of another trunk section, in accordance with some embodiments of the present disclosure.

FIG. 14A depicts a perspective view of a male end of a trunk section 221 having a male electrical connector 1410 installed therein, in accordance with some embodiments of the present disclosure. FIG. 14B depicts an exploded perspective view of a male end of a trunk section 221, in accordance with some embodiments of the present disclosure. Further, FIG. 15 depicts an exploded view perspective view of a male end of a trunk section 211 aligned with a female end of another trunk section 221, in accordance with some embodiments of the present disclosure.

As depicted, trunk section 220 can include a first end 221 that comprises a female end configured to mate with a male end of a different trunk section. As further depicted, first end 221 includes a male electrical connector 1410 and a collar 1420. Male electrical connector 1410 comprises a main housing 1412, a contact set 1214, and securing member 1416. Male electrical connector 1410 can be configured to mate with female electrical connector 1305 such that electrical contact set 1414 mates with electrical contact set 1315. As depicted the respective electrical contact sets include two or four electrical contacts, however the contact sets may include more or less contacts. For example, and as further depicted and described herein, contact sets may include 2, 3, 4, 5, 6, or more contacts. Further, and as depicted in FIG. 14B, male electrical connector 1410 can be configured to be secured within trunk section 220. For example, male electrical connector 1410 can include one or more cavity and may be secured to the trunk 220 via external fasteners 1422 (e.g., screws, bolts, etc.). As another example, male electrical connector 1410 can include one or more integral fastening mechanism (e.g., tabs, etc.).

As further depicted, collar 1420 can include a recess 1421. The recess 1421 can be configured to receive the anti-rotation member 1325. Thus, mating the collar 1420 with the anti-rotation member 1325 of the female electrical connector 1305 can restrict rotation of the first trunk section 210 relative the second trunk section 220 and vice versa. This can be useful in many scenarios. For example, the anti-rotation member 1325 of the female electrical connector 1305 and the recess 1421 of the collar 1420 can be useful as an alignment mechanism to align the electrical contacts of the trunk sections 210, 220. Further, the anti-rotation member 1325 and the recess 1421 can prevent subsequent rotation or twisting, which could otherwise damage the electrical contacts.

An alternative embodiment of a collar 1420 can include an angled region that facilitates assembly of an artificial tree. The angled portion of the collar 1420 can slope downward at an angle of less than ninety degrees from a longitudinal axis. In one embodiment, the angled portion of the collar 1420 can be at an angle of between approximately thirty degrees and fifty degrees from the longitudinal axis. The combination of the angled collar 1420 and the anti-rotation member 1325 can facilitate assembly of an artificial tree, especially in an embodiment where the anti-rotation member 1325 is a rolling anti-rotation member. For example, the angled portion of the collar 1420 can disperse the force of weight of the second trunk section 220. Unlike a flat first end of a collar 1420 that directs the force of weight of a second trunk section 220 directly down, an angled first end converts a portion of the force of weight from directly down to parallel with the angled portion. The decreased downward force of weight of the second trunk section 220 can also result in less friction between the anti-rotation member 1325 and the collar 1420. This reduced friction can further facilitate rotation of the second trunk section 220 during tree assembly. For example, the reduced friction can facilitate the rotation required to align the anti-rotation member with the recess 1421.

Figure 16A:
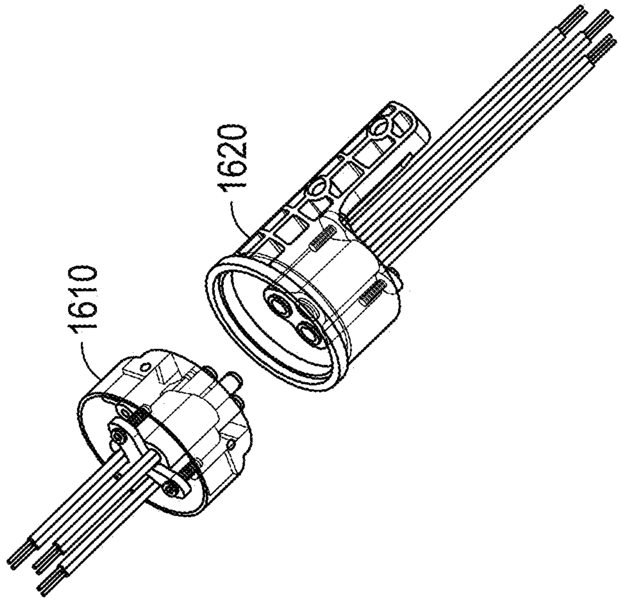
FIG. 16A depicts an exploded perspective view of a multi-terminal male connector and a multi-terminal female connector, in accordance with some embodiments of the present disclosure.
Figure 16B:
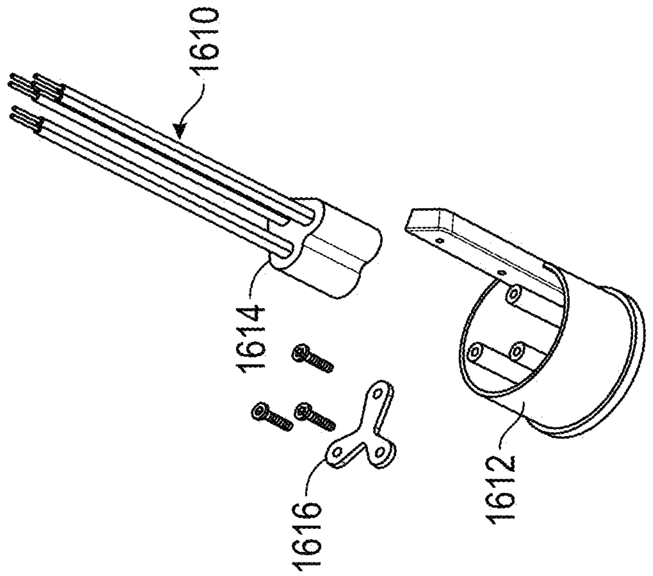
FIG. 16B depicts an exploded perspective view of a multi-terminal female connector, in accordance with some embodiments of the present disclosure.
Figure 16C:
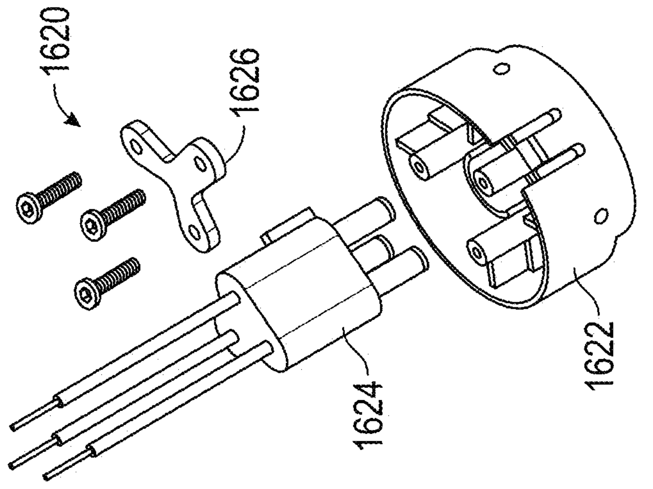
FIG. 16C depicts an exploded perspective view of a multi-terminal male connector, in accordance with some embodiments of the present disclosure.

FIG. 16A depicts an exploded perspective view of a multi-terminal female connector 1610 and a multi-terminal male connector 1620, in accordance with some embodiments of the present disclosure. FIG. 16B depicts an exploded perspective view of a multi-terminal female connector 1610, in accordance with some embodiments of the present disclosure. FIG. 16C depicts an exploded perspective view of a multi-terminal male connector 1620, in accordance with some embodiments of the present disclosure. As will be appreciated these multi-terminal connectors can be integrated in any of the previously described trunk portions of an artificial tree.

As depicted, multi-terminal female connector 1610 comprises a main housing 1612, a female electrical contact assembly 1614, and a securing member 1616. Female electrical connector 1610 can be configured to mate with male electrical connector 1620. Further, female electrical contact assembly 1614 includes three electrical contact sets. As will be appreciated, such a design provides for 6 individual electrical contacts. As further depicted, the electrical contact sets are arranged in a triangular pattern and are configured to be inserted into a first end of triangular insulating member, which is configured to receiving respective wires of a wiring harness in the other end.

As further depicted, multi-terminal male connector 1620 comprises a main housing 1622, a male electrical contact assembly 1624, and a securing member 1626. Male electrical connector 1620 can be configured to mate with female electrical connector 1610. Further, male electrical contact assembly 1624 includes three electrical contact sets. As will be appreciated, such a design provides for 6 individual electrical contacts. As further depicted, the electrical contact sets are arranged in a triangular pattern and are configured to be inserted into a first end of triangular insulating member, which is configured to receiving respective wires of a wiring harness in the other end.

Figure 17A:
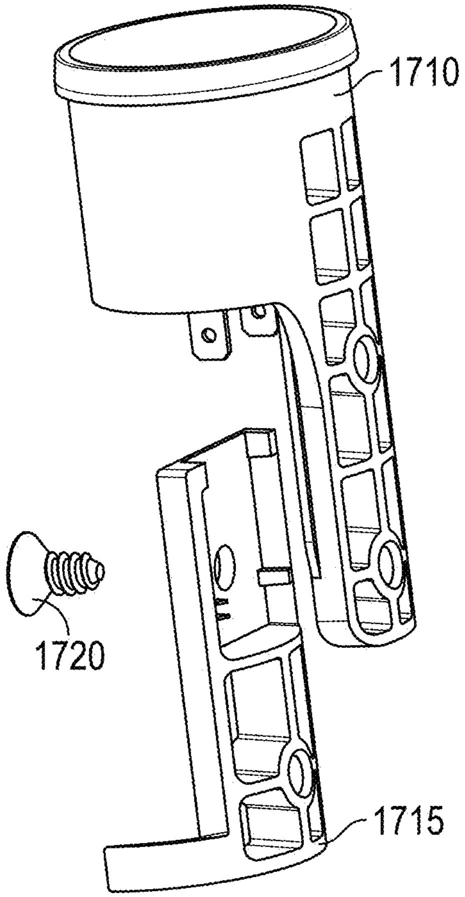
FIG. 17A depicts an exploded perspective view of a female connector including an extending portion, in accordance with some embodiments of the present disclosure.
Figure 17B:
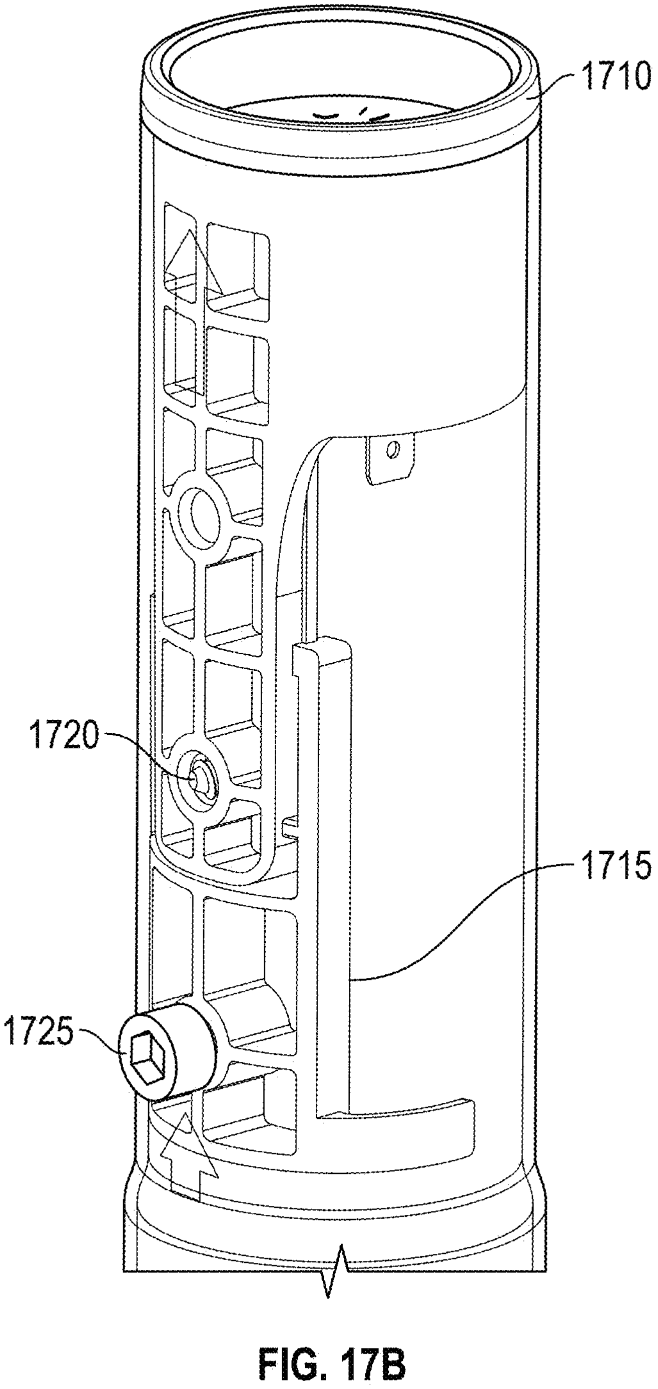
FIG. 17B depicts an exploded perspective view of a female connector including an extending portion, in accordance with some embodiments of the present disclosure.

FIG. 17A depicts an exploded perspective view of a female connector 1710 including an extending portion 1715, in accordance with some embodiments of the present disclosure. FIG. 17B depicts a perspective view trunk portion including a female connector 1710 including an extending portion 1715, in accordance with some embodiments of the present disclosure. As depicted, female connector 1710 can include an extension portion 1715 that is affixed with a fastener 1720 (e.g., screw, bolt, tab, etc.). As will be appreciated, the extension portion can be utilized to extend the distance between the end of the trunk portion and the anti-rotation member 1725. This can be desirable in order to ensure consistent spacing between branch portions throughout the tree.

The present disclosure can be implemented according to at least the following:

Clause 1: An artificial tree system comprising: a first trunk section having an elongate body, the first trunk section including: a first electrical connector disposed at least partially within the first trunk section, the first electrical connector comprising: a first plurality of electrical contacts, and an anti-twist component connected to the first electrical connector through a hole in the first trunk section; a second trunk section having an elongate body, the second trunk section including: a collar having a receiving cavity; and a second electrical connector disposed at least partially within the second trunk section, the second electrical connector comprising a second plurality of electrical contacts, wherein the first trunk section is configured to engage the second trunk section such that as the anti-twist component engages the receiving cavity of the collar such that the first trunk section cannot rotate relative the second trunk section, and wherein when the first trunk section is mated with the second trunk section, the first plurality of electrical contacts connect with respective contacts of the second plurality of electrical contacts.

Clause 2: The artificial tree system of Clause 1, wherein the first electrical connector comprises a third plurality of electrical contacts and the second electrical connector comprises a fourth plurality of electrical contacts.

Clause 3: The artificial tree system of Clause 2, wherein when the first trunk section is mated with the second trunk section, the third plurality of electrical contacts connect with respective contacts of the fourth plurality of electrical contacts.

Clause 4: The artificial tree system of Clause 3, wherein the first electrical connector comprises a fifth plurality of electrical contacts and the second electrical connector comprises a sixth plurality of electrical contacts.

Clause 5: The artificial tree system of Clause 4, wherein when the first trunk section is mated with the second trunk section, the fifth plurality of electrical contacts connect with respective contacts of the sixth plurality of electrical contacts.

Clause 6: The artificial tree system of Clause 5, wherein the first electrical connector comprises a first insulating component configured to house the first plurality of electrical contacts, the third plurality of electrical contacts, and the fifth plurality of electrical contacts.

Clause 7: The artificial tree system of Clause 6, wherein the second electrical connector comprises a second insulating component configured to house the second plurality of electrical contacts, the fourth plurality of electrical contacts, and the sixth plurality of electrical contacts.

Clause 8: The artificial tree system of Clause 7, wherein the first and second insulating components comprise a triangular cross-sectional shape.

Clause 9: The artificial tree system of Clause 1, wherein the collar comprises a sloped surface.

Clause 10: The artificial tree system of Clause 1, wherein the first electrical connector an extension component.

Clause 11: An artificial tree system comprising: a first trunk section having an elongate body, the first trunk section including: a first electrical connector disposed at least partially within the first trunk section, the first electrical connector comprising: a first plurality of electrical contacts, and an anti-twist component connected to the first electrical connector through a hole in the first trunk section; a second trunk section having an elongate body, the second trunk section including: a collar having an angled portion that slopes downward at an angle of less than ninety degrees from a longitudinal axis of the second trunk section; and a second electrical connector disposed at least partially within the second trunk section, the second electrical connector comprising a second plurality of electrical contacts, wherein the first trunk section is configured to engage the second trunk section such that as the anti-twist component engages the angled portion of the collar such that the first trunk section cannot rotate relative the second trunk section, and wherein when the first trunk section is mated with the second trunk section, the first plurality of electrical contacts connect with respective contacts of the second plurality of electrical contacts.

Clause 12: The artificial tree system of Clause 11, wherein the first electrical connector comprises a third plurality of electrical contacts and the second electrical connector comprises a fourth plurality of electrical contacts.

Clause 13: The artificial tree system of Clause 12, wherein when the first trunk section is mated with the second trunk section, the third plurality of electrical contacts connect with respective contacts of the fourth plurality of electrical contacts.

Clause 14: The artificial tree system of Clause 13, wherein the first electrical connector comprises a fifth plurality of electrical contacts and the second electrical connector comprises a sixth plurality of electrical contacts.

Clause 15: The artificial tree system of Clause 14, wherein when the first trunk section is mated with the second trunk section, the fifth plurality of electrical contacts connect with respective contacts of the sixth plurality of electrical contacts.

Clause 16: The artificial tree system of Clause 15, wherein the first electrical connector comprises a first insulating component configured to house the first plurality of electrical contacts, the third plurality of electrical contacts, and the fifth plurality of electrical contacts.

Clause 17: The artificial tree system of Clause 16, wherein the second electrical connector comprises a second insulating component configured to house the second plurality of electrical contacts, the fourth plurality of electrical contacts, and the sixth plurality of electrical contacts.

Clause 18: The artificial tree system of Clause 17, wherein the first and second insulating components comprise a triangular cross-sectional shape.

Clause 19: The artificial tree system of Clause 11, wherein the collar further comprises a receiving cavity.

Clause 20: The artificial tree system of Clause 11, wherein the first electrical connector an extension component.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

What is claimed is:

1. An artificial tree system comprising:

a first trunk section having an elongate body, the first trunk section including:

a first electrical connector disposed at least partially within the first trunk section, the first electrical connector comprising:

a first plurality of electrical contacts and a third plurality of electrical contacts, and an anti-twist component connected to the first electrical connector through a hole in the first trunk section;

a second trunk section having an elongate body, the second trunk section including:

a collar having a receiving cavity; and a second electrical connector disposed at least partially within the second trunk section, the second electrical connector comprising a second plurality of electrical contacts and a fourth plurality of electrical contacts, wherein the first trunk section is configured to engage the second trunk section such that as the anti-twist component engages the receiving cavity of the collar such that the first trunk section cannot rotate relative the second trunk section, and wherein when the first trunk section is mated with the second trunk section, the first plurality of electrical contacts connect with respective contacts of the second plurality of electrical contacts.

2. The artificial tree system of claim 1, wherein when the first trunk section is mated with the second trunk section, the third plurality of electrical contacts connect with respective contacts of the fourth plurality of electrical contacts.

3. The artificial tree system of claim 2, wherein the first electrical connector comprises a fifth plurality of electrical contacts and the second electrical connector comprises a sixth plurality of electrical contacts.

4. The artificial tree system of claim 3, wherein when the first trunk section is mated with the second trunk section, the fifth plurality of electrical contacts connect with respective contacts of the sixth plurality of electrical contacts.

5. The artificial tree system of claim 4, wherein the first electrical connector comprises a first insulating component configured to house the first plurality of electrical contacts, the third plurality of electrical contacts, and the fifth plurality of electrical contacts.

6. The artificial tree system of claim 5, wherein the second electrical connector comprises a second insulating component configured to house the second plurality of electrical contacts, the fourth plurality of electrical contacts, and the sixth plurality of electrical contacts.

7. The artificial tree system of claim 6, wherein the first and second insulating components comprise a triangular cross-sectional shape.

8. The artificial tree system of claim 1, wherein the collar comprises a sloped surface.

9. The artificial tree system of claim 1, wherein the first electrical connector an extension component.

10. An artificial tree system comprising:

a first trunk section having an elongate body, the first trunk section including:

a first electrical connector disposed at least partially within the first trunk section, the first electrical connector comprising:

a first plurality of electrical contacts, a third plurality of electrical contacts, and an anti-twist component connected to the first electrical connector through a hole in the first trunk section;

a second trunk section having an elongate body, the second trunk section including:

a collar having an angled portion that slopes downward at an angle of less than ninety degrees from a longitudinal axis of the second trunk section; and a second electrical connector disposed at least partially within the second trunk section, the second electrical connector comprising a second plurality of electrical contacts and a fourth plurality of electrical contacts, wherein the first trunk section is configured to engage the second trunk section such that as the anti-twist component engages the angled portion of the collar such that the first trunk section cannot rotate relative the second trunk section, and wherein when the first trunk section is mated with the second trunk section, the first plurality of electrical contacts connect with respective contacts of the second plurality of electrical contacts.

11. The artificial tree system of claim 10, wherein when the first trunk section is mated with the second trunk section, the third plurality of electrical contacts connect with respective contacts of the fourth plurality of electrical contacts.

12. The artificial tree system of claim 11, wherein the first electrical connector comprises a fifth plurality of electrical contacts and the second electrical connector comprises a sixth plurality of electrical contacts.

13. The artificial tree system of claim 12, wherein when the first trunk section is mated with the second trunk section, the fifth plurality of electrical contacts connect with respective contacts of the sixth plurality of electrical contacts.

14. The artificial tree system of claim 13, wherein the first electrical connector comprises a first insulating component configured to house the first plurality of electrical contacts, the third plurality of electrical contacts, and the fifth plurality of electrical contacts.

15. The artificial tree system of claim 14, wherein the second electrical connector comprises a second insulating component configured to house the second plurality of electrical contacts, the fourth plurality of electrical contacts, and the sixth plurality of electrical contacts.

16. The artificial tree system of claim 15, wherein the first and second insulating components comprise a triangular cross-sectional shape.

17. The artificial tree system of claim 10, wherein the collar further comprises a receiving cavity.

18. The artificial tree system of claim 10, wherein the first electrical connector an extension component.

* * * * *